United States Patent
Akahane et al.

(10) Patent No.: US 10,410,022 B2
(45) Date of Patent: Sep. 10, 2019

(54) CARD READER AND CARD READER CONTROL METHOD

(71) Applicant: NIDEC SANKYO CORPORATION, Suwa-gun, Nagano (JP)

(72) Inventors: Fumihiko Akahane, Nagano (JP); Yasuhiro Kitazawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 15/738,262

(22) PCT Filed: Mar. 8, 2017

(86) PCT No.: PCT/JP2017/009118
§ 371 (c)(1),
(2) Date: Jan. 22, 2019

(87) PCT Pub. No.: WO2017/163864
PCT Pub. Date: Sep. 28, 2017

(65) Prior Publication Data
US 2019/0138761 A1   May 9, 2019

(30) Foreign Application Priority Data
Mar. 24, 2016 (JP) .................. 2016-059564

(51) Int. Cl.
*G06K 7/10* (2006.01)
*G06K 13/06* (2006.01)
(Continued)

(52) U.S. Cl.
CPC ............ *G06K 7/10* (2013.01); *G06K 7/082* (2013.01); *G06K 13/06* (2013.01); *G06K 13/0806* (2013.01); *G06K 7/0008* (2013.01)

(58) Field of Classification Search
CPC ...... G06K 7/10; G06K 7/082; G06K 13/0806; G06K 13/06; G06K 7/0008
See application file for complete search history.

(56) References Cited

U.S. PATENT DOCUMENTS 9,779,273 B2 * 10/2017 Takeda ............... G07F 19/2055
10,007,814 B2 *  6/2018 Hoson .................... G06K 7/08
(Continued)

FOREIGN PATENT DOCUMENTS

JP   2010170379 A   8/2010
JP   2013037555 A   2/2013
(Continued)

OTHER PUBLICATIONS

International Search Report for corresponding Application No. PCT/JP2017/009118; dated May 23, 2017.

*Primary Examiner* — Seung H Lee
(74) *Attorney, Agent, or Firm* — Cantor Colburn LLP

(57) ABSTRACT

A card reader use in a higher-level device may include a card transfer path; a card insertion detecting mechanism; a transfer roller; a turn detecting mechanism structured to detect a turn of the transfer roller; a card detecting mechanism; and a control unit. The control unit structured such that, if the card detecting mechanism switches from the OFF situation to the ON situation after the card insertion detecting mechanism switches from the OFF situation to the ON situation, even though no turn of the transfer roller is detected by the turn detecting mechanism, the control unit of the card reader sends a control unit of the higher-level device an alarm signal for notifying that a skimming device has been inserted through the insertion slot.

2 Claims, 8 Drawing Sheets

(51) Int. Cl.
*G06K 13/08* (2006.01)
*G06K 7/08* (2006.01)
*G06K 7/00* (2006.01)

(56) References Cited

U.S. PATENT DOCUMENTS

2007/0158432 A1* 7/2007 Tadamasa .............. G06K 13/08
                                                  235/480
2017/0061167 A1* 3/2017 McNicoll ............. G06K 7/0095

FOREIGN PATENT DOCUMENTS

| JP | 2015207075 A | 11/2015 |
| WO | 2011093340 A1 | 8/2011 |
| WO | 2017163864 A1 | 9/2017 |

* cited by examiner

CARD READER AND CARD READER CONTROL METHOD

CROSS REFERENCE TO RELATED APPLICATIONS

This is the U.S. national stage of application No. PCT/JP2017/009118, filed on Mar. 8, 2016. Priority under 35 U.S.C. § 119(a) and 35 U.S.C. § 365(b) is claimed from Japanese Application No. 2016-059564, filed Mar. 24, 2016; the disclosure of which is incorporated herein by reference.

FIELD OF THE INVENTION

At least an embodiment of the present invention relates to a card reader that executes reading magnetic data recorded in a card and recording magnetic data into a card. Moreover, at least an embodiment of the present invention also relates to a card reader control method.

BACKGROUND

Conventionally, card readers for reading magnetic data recorded in a card and recording magnetic data into a card are widely used. In the industry of financial organizations and the like in which card readers are used, traditionally so-called "skimming" is a serious issue in which a criminal installs a magnetic head at a card insertion part of a card reader so as to illegally obtain magnetic data of the card by use of the magnetic head. In order to avoid such a problem, proposed is a card reader equipped with a metal sensor for detecting a magnetic head for skimming (hereinafter, called a "skimming magnetic head") having been installed at a front side of a card insertion part (for example, refer to Patent Document 1).

In a card reader described in Patent Document 1, a metal sensor is placed inside a card insertion part that is formed as a hollow part. Meanwhile, the metal sensor includes a core made of a magnetic material, a couple of exciting coils wound on the core, and a detection coil. In the case of this card reader; at a time when the metal sensor detects a foreign object including a metallic material, a predetermined process for handling an abnormal situation is executed, so that it becomes possible to prevent a skimming magnetic head, attached at a front side of the card insertion part, from reading magnetic data.

PATENT DOCUMENT

Patent Document 1: Japanese Unexamined Patent Application Publication No. 2013-37555

A skimming method by a criminal becomes sophisticated year by year, and there happens a case in which a device for skimming, such as a skimming magnetic head (hereinafter, called a "skimming device") for reading magnetic data of a card, is attached inside a card reader. In the case of the card reader described in Patent Document 1; though the metal sensor is able to detect a skimming device attached at the front side of the card insertion part, the metal sensor cannot detect a skimming device attached inside the card reader. Therefore, in the case of this card reader, if a skimming device is attached inside the card reader, it is impossible to prevent the skimming device from reading magnetic data. Moreover, in the case of this card reader, it is impossible to prevent the skimming device from being attached inside the card reader.

SUMMARY

Then, at least an embodiment of the present invention provides a card reader and a card reader control method, with which it is possible to prevent a skimming device having a certain shape from being attached inside the card reader. Moreover, at least an embodiment of the present invention provides a card reader and a card reader control method, with which it is possible to prevent a skimming device, configured with an electrically-conductive material and having a certain shape, from reading magnetic data even if the skimming device is attached inside the card reader by any chance. Furthermore, at least an embodiment of the present invention provides a card reader and a control method therefor, with which it is possible to prevent a skimming device, configured with a metal and having a certain shape, from being attached inside the card reader.

In order to bring a solution for the above; a card reader according to at least an embodiment of the present invention, to be installed for use in a higher-level device, where a side with an insertion slot configured for a card is represented as a near side, and an opposite side to the near side is represented as a deep side, the card reader comprising: a card transfer path where the card inserted through the insertion slot is transferred; a card insertion detecting mechanism, placed at a deep side of the insertion slot, for detecting the card by way of switching from an OFF situation to an ON situation; a transfer roller, placed at a deeper side position than the card insertion detecting mechanism is, for transferring the card through the card transfer path; a turn detecting mechanism for detecting a turn of the transfer roller; and a card detecting mechanism, placed at a deeper side position than the transfer roller is, for detecting the card by way of switching from an OFF situation to an ON situation; wherein, if the card detecting mechanism switches from the OFF situation to the ON situation after the card insertion detecting mechanism switches from the OFF situation to the ON situation, even though no turn of the transfer roller is detected by the turn detecting mechanism, a control unit of the card reader sends a control unit of the higher-level device an alarm signal for notifying that a skimming device has been inserted through the insertion slot.

Moreover, in order to bring a solution for the subject described above; a control method for a card reader according to at least an embodiment of the present invention, to be installed for use in a higher-level device, where a side with an insertion slot configured for a card is represented as a near side, and an opposite side to the near side is represented as a deep side, the card reader comprising: a card transfer path where the card inserted through the insertion slot is transferred; a card insertion detecting mechanism, placed at a deep side of the insertion slot, for detecting the card by way of switching from an OFF situation to an ON situation; a transfer roller, placed at a deeper side position than the card insertion detecting mechanism is, for transferring the card through the card transfer path; a turn detecting mechanism for detecting a turn of the transfer roller; and a card detecting mechanism, placed at a deeper side position than the transfer roller is, for detecting the card by way of switching from an OFF situation to an ON situation; wherein, if the card detecting mechanism switches from the OFF situation to the ON situation after the card insertion detecting mechanism switches from the OFF situation to the ON situation, even though no turn of the transfer roller is detected by the turn detecting mechanism, an alarm signal for notifying that a skimming device has been inserted through the insertion slot is sent to a control unit of the higher-level device.

According to at least an embodiment of the present invention, if the card detecting mechanism switches from the OFF situation to the ON situation after the card insertion detecting mechanism switches from the OFF situation to the ON situation, even though no turn of the transfer roller is detected by the turn detecting mechanism, an alarm signal for notifying that a skimming device has been inserted through the insertion slot is sent to the control unit of the higher-level device. Therefore, according to at least an embodiment of the present invention; by way of executing a predetermined process by the control unit of the higher-level device that has received the alarm signal, it becomes possible to prevent the skimming device, having a certain shape, from being attached inside the card reader.

In other words, in the case where a normal card is inserted through the insertion slot; the card insertion detecting mechanism switches from the OFF situation to the ON situation, and then a deep side end of the card contacts the transfer roller, placed at a nearer side position than the card detecting mechanism is, so as to turn the transfer roller in such a way that, the turn detecting mechanism detects a turn of the transfer roller, and then subsequently the card detecting mechanism switches from the OFF situation to the ON situation. On the other hand, in the case where the skimming device, having a certain shape, is inserted through the insertion slot; after the card insertion detecting mechanism switches from the OFF situation to the ON situation, it may potentially happen that the card detecting mechanism switches from the OFF situation to the ON situation, without contacting the transfer roller by the skimming device.

Therefore, according to at least an embodiment of the present invention; in the case where the card detecting mechanism switches from the OFF situation to the ON situation after the card insertion detecting mechanism switches from the OFF situation to the ON situation, even though no turn of the transfer roller is detected by the turn detecting mechanism; by way of sending the control unit of the higher-level device the alarm signal for notifying that a skimming device has been inserted through the insertion slot, and moreover by way of executing a predetermined process by the control unit of the higher-level device that has received the alarm signal, it becomes possible to prevent the skimming device, having a certain shape, from being attached inside the card reader.

Furthermore, in order to bring a solution for the subject described above; a card reader according to at least an embodiment of the present invention, to be installed for use in a higher-level device, where a side with an insertion slot configured for a card is represented as a near side, and an opposite side to the near side is represented as a deep side, the card reader comprising: a card insertion detecting mechanism, placed at a deep side of the insertion slot, for detecting the card by way of switching from an OFF situation to an ON situation; a first card detecting mechanism, placed at a deeper side position than the card insertion detecting mechanism is, for detecting the card by way of switching from an OFF situation to an ON situation; and a second card detecting mechanism, placed at a deeper side position than the first card detecting mechanism is, for detecting the card by way of switching from an OFF situation to an ON situation; wherein, if the second card detecting mechanism switches to the ON situation even though the first card detecting mechanism is in the OFF situation, after the card insertion detecting mechanism switches from the OFF situation to the ON situation, and before the card insertion detecting mechanism switches from the ON situation to the OFF situation, a control unit of the card reader sends a control unit of the higher-level device an alarm signal for notifying that a skimming device has been inserted through the insertion slot.

Moreover, in order to bring a solution for the subject described above; a control method for a card reader according to at least an embodiment of the present invention, to be installed for use in a higher-level device, where a side with an insertion slot configured for a card is represented as a near side, and an opposite side to the near side is represented as a deep side, the card reader comprising: a card insertion detecting mechanism, placed at a deep side of the insertion slot, for detecting the card by way of switching from an OFF situation to an ON situation; a first card detecting mechanism, placed at a deeper side position than the card insertion detecting mechanism is, for detecting the card by way of switching from an OFF situation to an ON situation; and a second card detecting mechanism, placed at a deeper side position than the first card detecting mechanism is, for detecting the card by way of switching from an OFF situation to an ON situation; wherein, if the second card detecting mechanism switches to the ON situation even though the first card detecting mechanism is in the OFF situation, after the card insertion detecting mechanism switches from the OFF situation to the ON situation, and before the card insertion detecting mechanism switches from the ON situation to the OFF situation, an alarm signal for notifying that a skimming device has been inserted through the insertion slot is sent to a control unit of the higher-level device.

According to at least an embodiment of the present invention, if the second card detecting mechanism switches to the ON situation even though the first card detecting mechanism is in the OFF situation, after the card insertion detecting mechanism switches from the OFF situation to the ON situation, and before the card insertion detecting mechanism switches from the ON situation to the OFF situation, an alarm signal for notifying that a skimming device has been inserted through the insertion slot is sent to the control unit of the higher-level device. Therefore, according to at least an embodiment of the present invention; by way of executing a predetermined process by the control unit of the higher-level device that has received the alarm signal, it becomes possible to prevent the skimming device, having a certain shape, from being attached inside the card reader.

In other words, in the case where a normal card is inserted through the insertion slot; there is no chance that the second card detecting mechanism has the ON situation even though the first card detecting mechanism, placed at a nearer side position than the second card detecting mechanism, is in the OFF situation, after the card insertion detecting mechanism switches from the OFF situation to the ON situation, and before the card insertion detecting mechanism switches from the ON situation to the OFF situation. On the other hand, in the case where the skimming device, having a certain shape, is inserted through the insertion slot; after the card insertion detecting mechanism switches from the OFF situation to the ON situation, it may potentially happen that the second card detecting mechanism has the ON situation even though the first card detecting mechanism is in the OFF situation, before the card insertion detecting mechanism switches from the ON situation to the OFF situation.

Therefore, according to at least an embodiment of the present invention; in the case where the second card detecting mechanism has the ON situation even though the first card detecting mechanism is in the OFF situation, after the card insertion detecting mechanism switches from the OFF situation to the ON situation, and before the card insertion detecting mechanism switches from the ON situation to the OFF situation; by way of sending the control unit of the higher-level device the alarm signal for notifying that a skimming device has been inserted through the insertion slot, and moreover by way of executing a predetermined process by the control unit of the higher-level device that has received the alarm signal, it becomes possible to prevent the skimming device, having a certain shape, from being attached inside the card reader.

Still further, in order to bring a solution for the subject described above; a card reader according to at least an embodiment of the present invention, to be installed for use in a higher-level device, the card reader comprising: an IC contact block including a plurality of IC contact springs that contact an external connection terminal of an IC chip formed in a card; and a transfer mechanism, which transfers the IC contact block between a contact-enabled position where the IC contact springs are able to contact the external connection terminal, and an evacuating position where the IC contact springs evacuate in such a way as not to contact the external connection terminal; wherein, at a time when a permission command for inserting the card into an insertion slot for the card is input from a control unit of the higher-level device, a control unit of the card reader moves the IC contact block, located at the evacuating position, to the contact-enabled position, and supplies the IC contact springs with an electric current; and then if a short circuit is detected among the plurality of IC contact springs, the control unit of the card reader sends a control unit of the higher-level device an alarm signal for notifying that a skimming device is attached inside the card reader.

Moreover, in order to bring a solution for the subject described above; a control method for a card reader according to at least an embodiment of the present invention, to be installed for use in a higher-level device, the card reader comprising: an IC contact block including a plurality of IC contact springs that contact an external connection terminal of an IC chip formed in a card; and a transfer mechanism, which transfers the IC contact block between a contact-enabled position where the IC contact springs are able to contact the external connection terminal, and an evacuating position where the IC contact springs evacuate in such a way as not to contact the external connection terminal; wherein, at a time when a permission command for inserting the card into an insertion slot for the card is input from a control unit of the higher-level device, the IC contact block, located at the evacuating position, is moved to the contact-enabled position, and the IC contact springs are supplied with an electric current; and then if a short circuit is detected among the plurality of IC contact springs, an alarm signal for notifying that a skimming device is attached inside the card reader is sent to the control unit of the higher-level device.

According to at least an embodiment of the present invention; at a time when the permission command for inserting the card into the insertion slot for the card is input from a control unit of the higher-level device, the IC contact block, located at the evacuating position, is moved to the contact-enabled position, and the IC contact springs are supplied with an electric current; and then if a short circuit is detected among the plurality of IC contact springs, an alarm signal for notifying that a skimming device is attached inside the card reader is sent to the control unit of the higher-level device. Therefore, according to at least an embodiment of the present invention; by way of executing a predetermined process by the control unit of the higher-level device that has received the alarm signal, it becomes possible to prevent the skimming device, configured with an electrically-conductive material and having a certain shape, from reading magnetic data even if the skimming device is attached inside the card reader by any chance.

In other words, in the case where no skimming device, configured with an electrically-conductive material and having a certain shape, is attached inside the card reader, at a time when a permission command for inserting the card into the insertion slot for the card is input from the control unit of the higher-level device, even if the IC contact block, located at the evacuating position, is moved to the contact-enabled position, and the IC contact springs are supplied with an electric current, there is no chance that any short circuit is detected among the plurality of IC contact springs. On the other hand, in the case where a skimming device, configured with an electrically-conductive material and having a certain shape, is attached inside the card reader, at a time when a permission command for inserting the card into the insertion slot for the card is input from the control unit of the higher-level device; if the IC contact block, located at the evacuating position, is moved to the contact-enabled position, and the IC contact springs are supplied with an electric current, it may potentially happen that a short circuit is detected among the plurality of IC contact springs.

Therefore, according to at least an embodiment of the present invention; in the case where, at a time when a permission command for inserting the card into the insertion slot for the card is input from the control unit of the higher-level device, and the IC contact block, located at the evacuating position, is moved to the contact-enabled position, and the IC contact springs are supplied with an electric current; and if a short circuit is detected among the plurality of IC contact springs; by way of sending the control unit of the higher-level device the alarm signal for notifying that a skimming device is attached inside the card reader, and moreover by way of executing a predetermined process by the control unit of the higher-level device that has received the alarm signal, it becomes possible to prevent the skimming device, configured with an electrically-conductive material and having a certain shape, from reading magnetic data even if the skimming device is attached inside the card reader by any chance.

Furthermore, in order to bring a solution for the subject described above; a card reader according to at least an embodiment of the present invention, to be installed for use in a higher-level device, where a side with an insertion slot configured for a card is represented as a near side, and an opposite side to the near side is represented as a deep side, the card reader comprising: a card transfer path where the card inserted through the insertion slot is transferred; a card transfer mechanism for transferring the card through the card transfer path; a card insertion detecting mechanism, placed at a deep side of the insertion slot, for detecting the card by way of switching from an OFF situation to an ON situation; and a card detecting mechanism, placed at a deeper side position than the card insertion detecting mechanism is, for detecting the card by way of switching from an OFF situation to an ON situation; wherein, a near side end of the card, transferred to a deep side position by the card transfer mechanism, is placed at a nearer side position than the card detecting mechanism is, at a time of handling the card by the card reader, if the card detecting mechanism switches from the OFF situation to the ON situation, after the card insertion detecting mechanism switches from the OFF situation to the ON situation, at a time of taking the card into the card reader, and then the card detecting mechanism switches to the OFF situation, after the card insertion detecting mechanism switches from the ON situation to the OFF situation; a control unit of the card reader makes the card transfer mechanism carry out a transfer operation toward a near side, and subsequently sends a control unit of the higher-level device an alarm signal for notifying that a skimming device has been inserted through insertion slot if the card insertion detecting mechanism keeps on having the OFF situation.

Moreover, in order to bring a solution for the subject described above; a control method for a card reader according to at least an embodiment of the present invention, to be installed for use in a higher-level device, where a side with an insertion slot configured for a card is represented as a near side, and an opposite side to the near side is represented as a deep side, the card reader comprising: a card transfer path where the card inserted through the insertion slot is transferred; a card transfer mechanism for transferring the card through the card transfer path; a card insertion detecting mechanism, placed at a deep side of the insertion slot, for detecting the card by way of switching from an OFF situation to an ON situation; and a card detecting mechanism, placed at a deeper side position than the card insertion detecting mechanism is, for detecting the card by way of switching from an OFF situation to an ON situation; wherein, a near side end of the card, transferred to a deep side position by the card transfer mechanism, is placed at a nearer side position than the card detecting mechanism is, at a time of handling the card by the card reader, if the card detecting mechanism switches from the OFF situation to the ON situation, after the card insertion detecting mechanism switches from the OFF situation to the ON situation, at a time of taking the card into the card reader, and then the card detecting mechanism switches to the OFF situation, after the card insertion detecting mechanism switches from the ON situation to the OFF situation; the card transfer mechanism carries out a transfer operation toward a near side, and subsequently an alarm signal for notifying that a skimming device has been inserted through insertion slot is sent to a control unit of the higher-level device if the card insertion detecting mechanism keeps on having the OFF situation.

According to at least an embodiment of the present invention; if the card detecting mechanism switches from the OFF situation to the ON situation, after the card insertion detecting mechanism switches from the OFF situation to the ON situation, at a time of taking the card into the card reader, and then the card detecting mechanism switches to the OFF situation, after the card insertion detecting mechanism switches from the ON situation to the OFF situation; the card transfer mechanism carries out a transfer operation toward a near side, and subsequently an alarm signal for notifying that a skimming device has been inserted through insertion slot is sent to the control unit of the higher-level device if the card insertion detecting mechanism keeps on having the OFF situation. Therefore, according to at least an embodiment of the present invention; by way of executing a predetermined process by the control unit of the higher-level device that has received the alarm signal, it becomes possible to prevent the skimming device, having a certain shape, from being attached inside the card reader.

In other words, according to at least an embodiment of the present invention, the near side end of the card, transferred to the deep side position by the card transfer mechanism, is placed at the nearer side position than the card detecting mechanism is, at the time of handling the card by the card reader; and therefore, in the case where a normal card is inserted through the insertion slot; if the card detecting mechanism switches from the OFF situation to the ON situation, after the card insertion detecting mechanism switches from the OFF situation to the ON situation, at the time of taking the card into the card reader, there is no chance that the card detecting mechanism subsequently switches to the OFF situation, after the card insertion detecting mechanism switches from the ON situation to the OFF situation. On the other hand, in the case where the skimming device, having a certain shape, is inserted through the insertion slot; if the card detecting mechanism switches from the OFF situation to the ON situation, after the card insertion detecting mechanism switches from the OFF situation to the ON situation, at the time of taking the card into the card reader, it may potentially happen that the card detecting mechanism subsequently switches to the OFF situation, after the card insertion detecting mechanism switches from the ON situation to the OFF situation. Moreover, in this case; even if the card transfer mechanism carries out a transfer operation toward a near side, it may potentially happen that the skimming device, having a certain shape, is not transferred, and the card insertion detecting mechanism keeps on having the OFF situation.

Therefore, according to at least an embodiment of the present invention; in the case where the card detecting mechanism switches from the OFF situation to the ON situation, after the card insertion detecting mechanism switches from the OFF situation to the ON situation, at the time of taking the card into the card reader, and then if the card detecting mechanism switches to the OFF situation, after the card insertion detecting mechanism switches from the ON situation to the OFF situation, the card transfer mechanism carries out a transfer operation toward a near side; and if the card insertion detecting mechanism subsequently keeps on having the OFF situation, by way of sending the control unit of the higher-level device the alarm signal for notifying that a skimming device has been inserted through insertion slot, and moreover by way of executing a predetermined process by the control unit of the higher-level device that has received the alarm signal, it becomes possible to prevent the skimming device, having a certain shape, from being attached inside the card reader.

Incidentally, for example, if a card with a special design, partially having a portion that the card detecting mechanism cannot detect, is inserted through the insertion slot, the card detecting mechanism switches from the OFF situation to the ON situation, after the card insertion detecting mechanism switches from the OFF situation to the ON situation, at the time of taking the card into the card reader; and then, it may potentially happen that the card detecting mechanism subsequently switches to the OFF situation, after the card insertion detecting mechanism switches from the ON situation to the OFF situation. Fortunately, in this case; by way of a transfer operation toward a near side by the card transfer mechanism, the card is transferred toward the near side so that the card insertion detecting mechanism switches from the OFF situation to the ON situation. Therefore, according to at least an embodiment of the present invention, it becomes possible to determine whether a card with a special design, as described above, has been inserted through the insertion slot, or a skimming device having a certain shape has been inserted through the insertion slot.

Still further, in order to bring a solution for the subject described above; a card reader according to at least an embodiment of the present invention, to be installed for use in a higher-level device, where a side with an insertion slot configured for a card is represented as a near side, and an opposite side to the near side is represented as a deep side, the card reader comprising: a card transfer path where the card inserted through the insertion slot is transferred; a card transfer mechanism for transferring the card through the card transfer path; a metal detecting mechanism, placed at a deep side position of the insertion slot, for detecting an external connection terminal of an IC chip, formed in the card, by way of switching from an OFF situation to an ON situation; and a card detecting mechanism, placed at a deeper side position than the metal detecting mechanism is, for detecting the card by way of switching from an OFF situation to an ON situation; wherein, a near side end of the card, transferred to a deep side position by the card transfer mechanism, is placed at a nearer side position than the card detecting mechanism is, at a time of handling the card by the card reader, if the metal detecting mechanism turns ON and OFF in a mode, which is different from a mode in the case where the card being a normal card, with the external connection terminal formed, is inserted through the insertion slot, at a time of taking the card into the card reader, and the card detecting mechanism switches to the OFF situation, after the card detecting mechanism switches from the OFF situation to the ON situation; a control unit of the card reader sends a control unit of the higher-level device an alarm signal for notifying that a skimming device has been inserted through the insertion slot.

Moreover, in order to bring a solution for the subject described above; a control method for a card reader according to at least an embodiment of the present invention, to be installed for use in a higher-level device, where a side with an insertion slot configured for a card is represented as a near side, and an opposite side to the near side is represented as a deep side, the card reader comprising: a card transfer path where the card inserted through the insertion slot is transferred; a card transfer mechanism for transferring the card through the card transfer path; a metal detecting mechanism, placed at a deep side position of the insertion slot, for detecting an external connection terminal of an IC chip, formed in the card, by way of switching from an OFF situation to an ON situation; and a card detecting mechanism, placed at a deeper side position than the metal detecting mechanism is, for detecting the card by way of switching from an OFF situation to an ON situation; wherein, a near side end of the card, transferred to a deep side position by the card transfer mechanism, is placed at a nearer side position than the card detecting mechanism is, at a time of handling the card by the card reader, if the metal detecting mechanism turns ON and OFF in a mode, which is different from a mode in the case where the card being a normal card, with the external connection terminal formed, is inserted through the insertion slot, at a time of taking the card into the card reader, and the card detecting mechanism switches to the OFF situation, after the card detecting mechanism switches from the OFF situation to the ON situation; an alarm signal for notifying that a skimming device has been inserted through the insertion slot is sent to a control unit of the higher-level device.

According to at least an embodiment of the present invention; if the metal detecting mechanism turns ON and OFF in a mode, which is different from a mode in the case where the card being a normal card, with the external connection terminal formed, is inserted through the insertion slot, at a time of taking the card into the card reader, and the card detecting mechanism switches to the OFF situation, after the card detecting mechanism switches from the OFF situation to the ON situation; an alarm signal for notifying that a skimming device has been inserted through the insertion slot is sent to the control unit of the higher-level device. Therefore, according to at least an embodiment of the present invention; by way of executing a predetermined process by the control unit of the higher-level device that has received the alarm signal, it becomes possible to prevent the skimming device, configured with a metal and having a certain shape, from being attached inside the card reader.

In other words, according to at least an embodiment of the present invention, the near side end of the card, transferred to the deep side position by the card transfer mechanism, is placed at the nearer side position than the card detecting mechanism is, at the time of handling the card by the card reader; and therefore, in the case where a normal card is inserted through the insertion slot; at the time of taking the card into the card reader, there is no chance that the card detecting mechanism switches to the OFF situation, after the card detecting mechanism switches from the OFF situation to the ON situation. On the other hand, in the case where the skimming device, configured with a metal and having a certain shape, is inserted through the insertion slot; it may potentially happen that the metal detecting mechanism turns ON and OFF in a mode, which is different from a mode in the case where the card being a normal card, with the external connection terminal formed, is inserted through the insertion slot, at the time of taking the card into the card reader, and the card detecting mechanism switches to the OFF situation, after the card detecting mechanism switches from the OFF situation to the ON situation.

Therefore, according to at least an embodiment of the present invention; in the case where the metal detecting mechanism turns ON and OFF in a mode, which is different from a mode in the case where the card being a normal card, with the external connection terminal formed, is inserted through the insertion slot, at the time of taking the card into the card reader, and the card detecting mechanism switches to the OFF situation, after the card detecting mechanism switches from the OFF situation to the ON situation, by way of sending the control unit of the higher-level device the alarm signal for notifying that a skimming device has been inserted through insertion slot, and moreover by way of executing a predetermined process by the control unit of the higher-level device that has received the alarm signal, it becomes possible to prevent the skimming device, configured with a metal and having a certain shape, from being attached inside the card reader.

Incidentally, for example, if a card with a special design, partially having a portion that the card detecting mechanism cannot detect, is inserted through the insertion slot; at the time of taking the card into the card reader, it may potentially happen that the card detecting mechanism switches to the OFF situation, after the card detecting mechanism switches from the OFF situation to the ON situation. Fortunately, in this case; if the external connection terminal is formed at the same position in the card with a special design, as it is in the card being a normal card; the metal detecting mechanism turns ON and OFF in the same mode as a mode in the case where the card being a normal card is inserted through the insertion slot. Therefore, according to at least an embodiment of the present invention, it becomes possible to determine whether the card with a special design, in which the external connection terminal is formed at the same position as it is in the card being a normal card, has been inserted through insertion slot, or a skimming device, configured with a metal and having a certain shape, has been inserted through insertion slot.

As described above, according to at least an embodiment of the present invention, it becomes possible to prevent a skimming device, having a certain shape, from being attached inside the card reader. Moreover, according to at least an embodiment of the present invention, it becomes possible to prevent a skimming device, configured with an electrically-conductive material and having a certain shape, from reading magnetic data even if the skimming device is attached inside the card reader by any chance. Furthermore, according to at least an embodiment of the present invention, it becomes possible to prevent a skimming device, configured with a metal and having a certain shape, from being attached inside the card reader.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8A is a plan view diagram for explaining a configuration of a card reader according to another embodiment of the present invention, and FIG. 8B and FIG. 8C are plan view drawings for explaining a relationship in a layout of each configuration of a skimming device presumed to be attached inside the card reader shown in FIG. 8A, and the card reader.

DETAILED DESCRIPTION

An embodiment of the present invention is described below with reference to the accompanying drawings.
(Configuration of Card Reader)

Figure 1A:
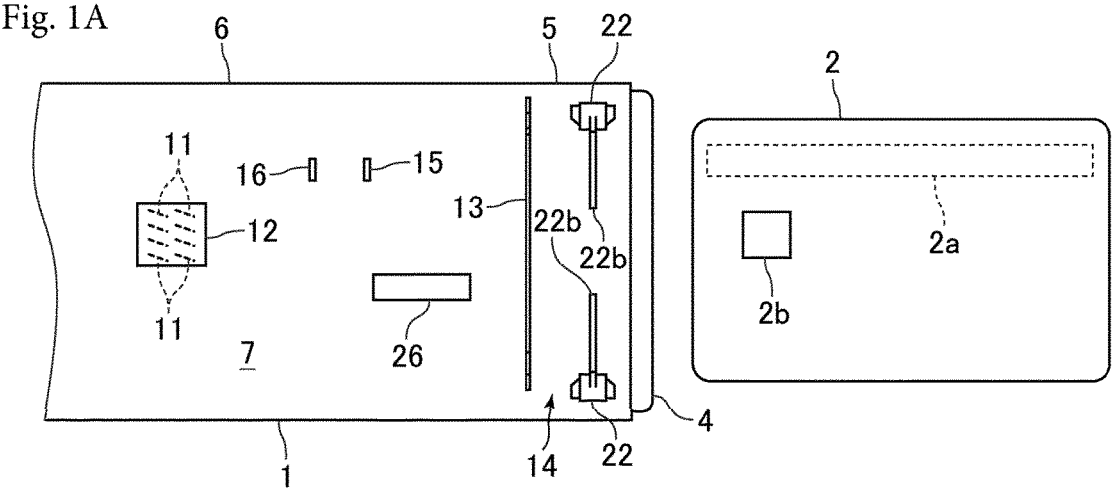
FIGS. 1(A), 1(B), and 1(C) include plan views for explaining a configuration of a card reader according to an embodiment of the present invention.
Figure 1B:
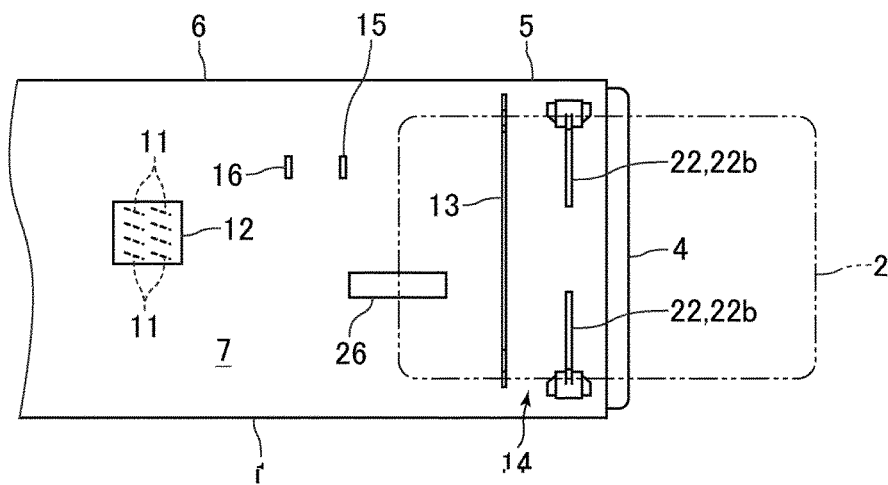
Figure 1C:
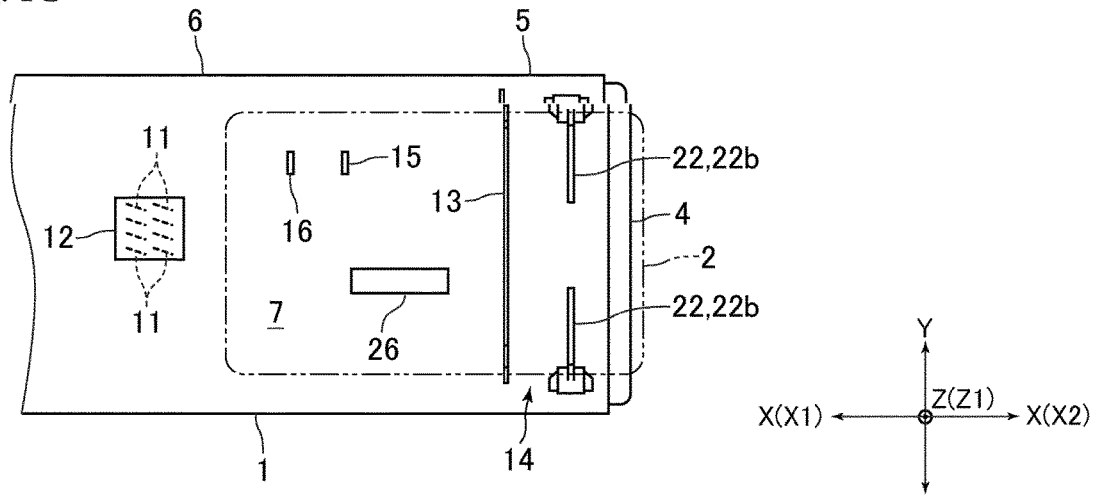
Figure 2:
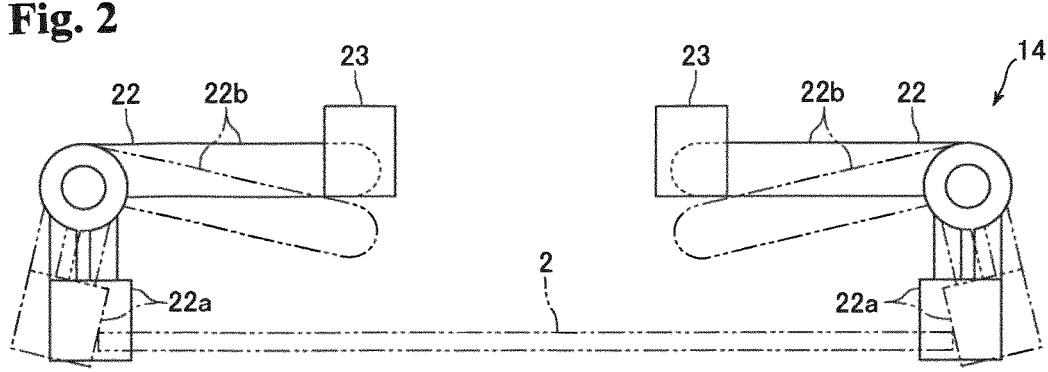
FIG. 2 is a front elevational view for explaining a configuration of a card insertion detecting mechanism shown in FIGS. 1A, 1B, and 1C.
Figure 3:
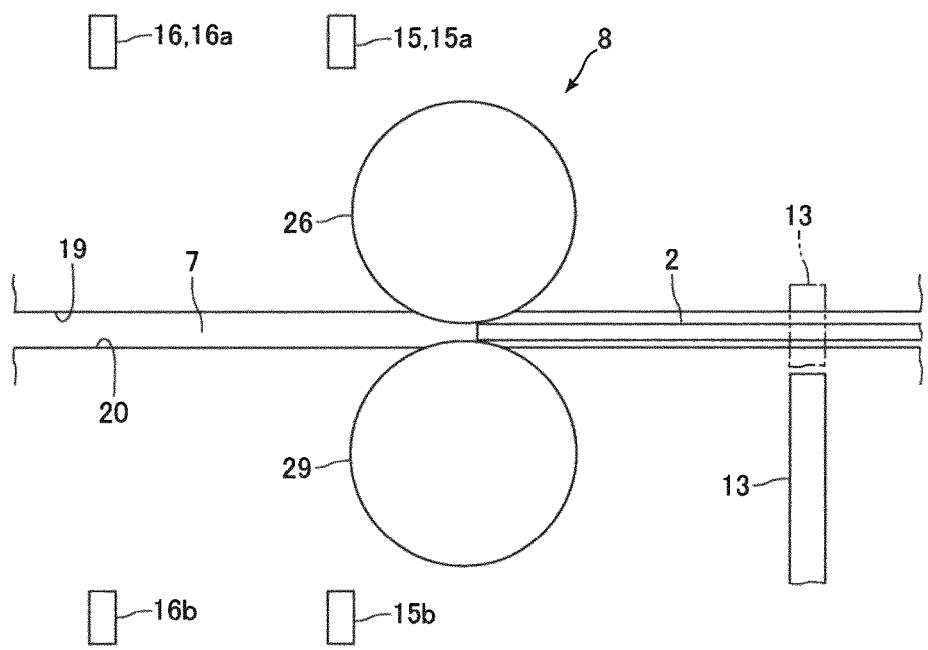
FIG. 3 is a side elevational view for explaining a configuration of a card detecting mechanism and a transfer roller, which are shown in FIGS. 1A, 1B, and 1C.
Figure 4:
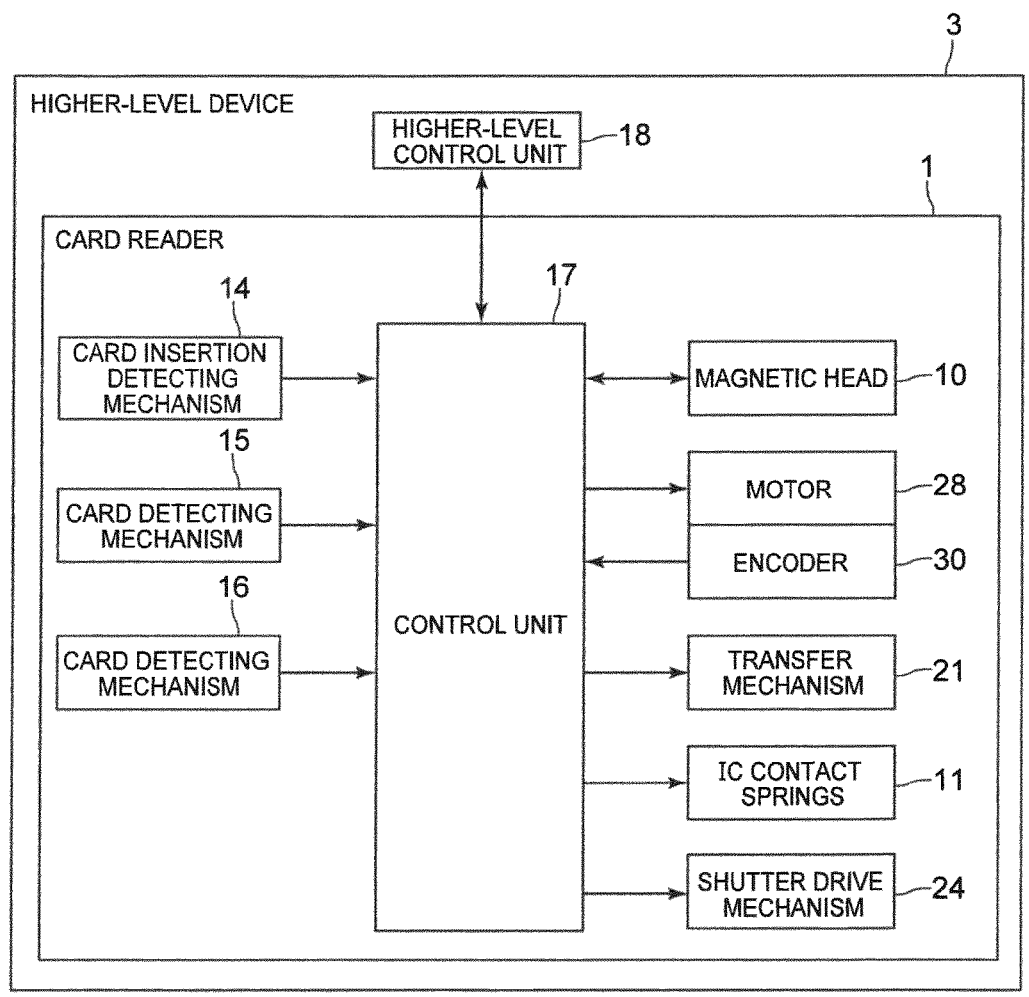
FIG. 4 is a block diagram of a higher-level device where the card reader shown in FIGS. 1A, 1B, and 1C is built in, and the card reader itself.

FIGS. 1A, 1B, and 1C include plan views for explaining a configuration of a card reader 1 according to the embodiment of the present invention. FIG. 2 is a front elevational view for explaining a configuration of a card insertion detecting mechanism 14 shown in FIGS. 1A, 1B, and 1C. FIG. 3 is a side elevational view for explaining a configuration of card detecting mechanisms 15 & 16 and a transfer roller 26, which are shown in FIGS. 1A, 1B, and 1C. FIG. 4 is a block diagram of a higher-level device 3 where the card reader 1 shown in FIGS. 1A, 1B, and 1C is built in, and the card reader 1 itself.

The card reader 1 according to the present embodiment is a device to carry out reading magnetic data recorded in a card 2 and recording magnetic data into the card 2; and the card reader 1 is used, while being installed in the higher-level device 3, such as an ATM (Automated Teller Machine) and the like. The card reader 1 includes; a card insertion part 5 in which an insertion slot 4 for inserting the card 2 is formed; and a main body 6. In the card reader 1, there is formed a card transfer path 7 for transferring the card 2 inserted through the insertion slot 4; and meanwhile, the card reader 1 is provided with a card transfer mechanism 8 (refer to FIG. 3) for transferring the card 2 through the card transfer path 7.

In the present embodiment, the card 2 is transferred in an X-direction shown in FIG. 1A and so on. Meanwhile, the card 2 is inserted in an X1-direction, and ejected in an X2-direction, wherein the X1-direction and the X2-direction being shown in FIG. 1A and so forth. In other words, the X1-direction is a direction for inserting the card 2 toward the insertion slot 4, and the X2-direction is a direction for ejecting the card 2 coming from the insertion slot 4. Meanwhile, a Z-direction shown in FIG. 1A and others, being perpendicular to the X-direction, is a direction of a thickness of the card 2 inserted into the insertion slot 4; and then a Y-direction shown in FIG. 1A and others, being perpendicular to the X-direction and the Z-direction, is a direction of a width of the card 2. In the following explanation; the X-direction is represented as a front-back direction, the Y-direction is a right-and-left direction, and then the Z-direction is represented as a vertical direction. Moreover, in the front-back direction; a side where the insertion slot 4 is formed (a side of the X2-direction) is represented as a "near" side, and an opposite side (a side of the X1-direction) is a "deep (rear)" side. Furthermore, in the vertical direction, one side (a side of the Z1-direction) is represented as an "upper" side, and an opposite side (a side of the Z2-direction) is a "lower" side.

The card 2 is a card made of polyvinyl chloride, which is shaped to be rectangular, having a thickness of about 0.7 to 0.8 mm. Moreover, the card 2 according to the present embodiment is a contact IC card provided with a magnetic stripe, which complies with the international standards (ISO/IEC 7811) and the JIS standards (JIS X6302). As shown in FIG. 1A, a magnetic stripe 2$a$, in which a magnetic datum is recorded, is formed on a back side surface (bottom side surface) of the card 2. Moreover, an IC chip is built in the card 2; and meanwhile, on a front side surface (top side surface) of the card 2, there is formed an external connection terminal 2$b$ of the IC chip. The magnetic stripe 2$a$ and the external connection terminal 2$b$ are formed at predetermined positions specified according to the international standards and the JIS standards.

The card reader 1 is provided with; a magnetic head 10 (refer to FIG. 4), which carries out at least either of reading a magnetic datum recorded in the magnetic stripe 2$a$ and recording a magnetic datum into the magnetic stripe 2$a$; and an IC contact block 12 including a plurality of IC contact springs 11 that contact the external connection terminal 2$b$ of the card 2. Furthermore, the card reader 1 is provided with; a shutter member 13 for blocking the card transfer path 7, the card insertion detecting mechanism 14 for detecting the card 2 having been inserted into the insertion slot 4, the card detecting mechanisms 15 & 16 for detecting presence of the card 2 in the card transfer path 7, and a control unit 17 for controlling the card reader 1. The control unit 17 is connected to a higher-level control unit 18 that is a control unit of the higher-level device 3.

The card insertion part 5 is connected to a front end of the main body 6. As shown in FIG. 3, the card transfer path 7 is provided with an upper guide member 19 that makes up an upper surface of the card transfer path 7, and a lower guide member 20 that makes up a lower surface of the card transfer path 7. The upper guide member 19 and the lower guide member 20 are formed of a resin material having an insulation quality. The magnetic head 10 and the IC contact block 12 are placed inside the main body 6. The magnetic head 10 is placed in such a way that a gap part of the magnetic head 10 faces the card transfer path 7 from a lower side. The IC contact block 12 is located at a nearer side position than the magnetic head 10 is. Moreover, the IC contact block 12 is placed in such a way as to face the card transfer path 7 from an upper side. The magnetic head 10 is electrically connected to the control unit 17.

To the IC contact block 12, there is connected a transfer mechanism 21 (refer to FIG. 4), which transfers the IC contact block 12 between a contact-enabled position where the IC contact springs 11 are able to contact the external connection terminal 2*b*, and an evacuating position where the IC contact springs 11 evacuate in such a way as not to contact the external connection terminal 2*b* (concretely to describe, the IC contact springs 11 evacuate upward). The transfer mechanism 21 is provided with a drive source such as a solenoid; and a power transmission mechanism, such as a link mechanism and the like, for transmitting a power from the drive source to the IC contact block 12. The transfer mechanism 21 is connected to the control unit 17. Concretely to describe, the drive source of the transfer mechanism 21 is electrically connected to the control unit 17. Meanwhile, the IC contact springs 11 are electrically connected to the control unit 17, and then the control unit 17 supplies the IC contact springs 11 with an electric current.

The card insertion detecting mechanism 14 is placed at a deep side of the insertion slot 4, and the card insertion detecting mechanism 14 detect the card 2 having been inserted through the insertion slot 4. The card insertion detecting mechanism 14 according to the present embodiment is a width detecting mechanism that detects the card 2 having been inserted through the insertion slot 4, by way of detecting a width (a width in a right-and-left direction) of the card 2 inserted through the insertion slot 4. As shown in FIG. 2, the card insertion detecting mechanism 14 is provided with two lever members 22 and two sensors 23, which are individually placed at both sides in the right-and-left direction. The card insertion detecting mechanism 14 is placed at a front end side section of the card insertion part 5. Meanwhile, the card insertion detecting mechanism 14 is electrically connected to the control unit 17. Concretely to describe, the two sensors 23 are electrically connected to the control unit 17. The sensors 23 are individually a transmission optical sensor including a light emitting part and a light receiving part, which are positioned so as to face each other. The sensors 23 are placed at upper side positions over the card transfer path 7, in such a way that the light emitting part and the light receiving part face each other in the front-back direction. Incidentally, the sensors 23 are not illustrated in FIGS. 1A, 1B, and 1C.

Each of the lever members 22 is formed so as to be almost L-shaped in a view from the front-back direction; and each lever member includes; a card contacting part 22*a* that is positioned at each of both end parts of the card transfer path 7 in a right-and-left direction; and a light blocking part 22*b* being extended from an upper end of the card contacting part 22*a* toward an inside in the right-and-left direction. Each of the lever members 22 has a border part between the card contacting part 22*a* and the light blocking part 22*b*, as its turning center; and each lever member is supported by a frame of the card insertion part 5, so as to be rotatable with regard to a turning axis direction in the front-back direction. The light blocking part 22*b* is placed at an upper side position over the card transfer path 7. In the meantime, each of the lever members 22 is biased with a spring member that is not illustrated in the drawings, in such a way that a lower end side of the card contacting part 22*a* is located within the card transfer path 7.

At a standby time before insertion of the card 2 into the insertion slot 4, the lower end side of the card contacting part 22*a* is located within the card transfer path 7, as shown with a solid line in FIG. 2, so that each of the two light blocking part 22*b* blocks up a space between the light emitting part and the light receiving part of each of the sensors 23. At the time, the card insertion detecting mechanism 14 is in an OFF situation. Under the situation, if the card 2 having a width of a predetermined dimension in a widthwise direction is inserted into the insertion slot 4, both right and left edges of the card 2 individually touch two lower end sides of the card contacting part 22*a* so that the two lever members 22 turn until two sets of the light blocking part 22*b* individually deviate from the space between the light emitting part and the light receiving part of each of the sensors 23, as shown with a chain double-dashed line in FIG. 2. If once the two sets of the light blocking part 22*b* individually deviate from the space between the light emitting part and the light receiving part of each of the two sensors 23, the card insertion detecting mechanism 14 gets into an ON situation.

On the other hand, if the width of the card 2 inserted into the insertion slot 4 is narrower than the predetermined width so that, in at least either of the two sensors 23, the light blocking part 22*b* does not deviate from the space between the light emitting part and the light receiving part of each of the sensors 23, the card insertion detecting mechanism 14 keeps on the OFF situation. In this way, the card insertion detecting mechanism 14 detects the card 2, by way of switching from the OFF situation to the ON situation in the case where the width in the right-and-left direction of the card 2 inserted into the insertion slot 4 is the predetermined width. Incidentally, the card insertion detecting mechanism 14 may be in an OFF situation, while the two sets of the light blocking part 22*b* individually deviate from the space between the light emitting part and the light receiving part of each of the sensors 23, at a standby time before insertion of the card 2 into the insertion slot 4. In this case; if the card 2 having the width of the predetermined dimension is inserted into the insertion slot 4 so that each of the two light blocking part 22*b* blocks up the space between the light emitting part and the light receiving part of each of the sensors 23, the card insertion detecting mechanism 14 gets into an ON situation.

The shutter member 13 is located at either a border part between the card insertion part 5 and the main body 6, or a rear end part of the card insertion part 5. To the shutter member 13, there is connected a shutter drive mechanism 24 (refer to FIG. 4). The shutter drive mechanism 24 is provided with a drive source such as a solenoid; and a power transmission mechanism, such as a link mechanism, for transmitting a power from the drive source to the shutter member 13. The shutter drive mechanism 24 is connected to the control unit 17. Concretely to describe, the drive source of the shutter drive mechanism 24 is electrically connected to the control unit 17.

The shutter member 13 is movable between a blocking position (a position shown with a chain double-dashed line in FIG. 3) for blocking up the card transfer path 7, and an opening position (a position shown with a solid line in FIG. 3) for opening the card transfer path 7 by way of evacuating from the card transfer path 7. According to the present embodiment, when the card insertion detecting mechanism 14 is in the OFF situation, the shutter member 13 is placed at the blocking position; and in the meantime, when the card insertion detecting mechanism 14 gets into the ON situation, the shutter member 13 moves from the blocking position to the opening position. In other words, if the card insertion detecting mechanism 14 switches from the OFF situation to the ON situation, the shutter member 13 moves from the blocking position to the opening position.

The card detecting mechanisms 15 & 16 are placed inside the main body 6. Namely, the card detecting mechanisms 15 & 16 are placed at deeper side positions than the card insertion detecting mechanism 14 is. Moreover, the card detecting mechanism 15 and the card detecting mechanism 16 are placed in such a way that they are located at different positions displaced from each other in a front-back direction. In the present embodiment, the card detecting mechanism 16 is placed at a deeper side position than the card detecting mechanism 15 is. The card detecting mechanisms 15 & 16 are electrically connected to the control unit 17. Meanwhile, the card detecting mechanisms 15 & 16 are individually transmission optical sensors including light emitting parts 15a & 16a and light receiving parts 15b & 16b, which are positioned so as to face each other, respectively. As shown in FIG. 3, the light emitting part 15a and the light receiving part 15b are placed so as to sandwich the card transfer path 7 in a vertical direction; and meanwhile, the light emitting part 16a and the light receiving part 16b are placed so as to sandwich the card transfer path 7 in the vertical direction.

In the case where the card 2 does not exist between the light emitting parts 15a & 16a and the light receiving parts 15b & 16b, the light receiving parts 15b & 16b receive light coming from the light emitting parts 15a & 16a, respectively. At the time, the card detecting mechanisms 15 & 16 are in an OFF situation. If once the card 2 enters a space between the light receiving parts 15b & 16b and the light emitting parts 15a & 16a in this situation, the light coming from the light emitting parts 15a & 16a toward the light receiving parts 15b & 16b is blocked to switch the card detecting mechanisms 15 & 16 into an ON situation. In this way, the card detecting mechanisms 15 & 16 detects the card 2 by way of switching from the OFF situation to the ON situation. In the present embodiment, the card detecting mechanism 15 is a first card detecting mechanism, and meanwhile the card detecting mechanism 16 is a second card detecting mechanism.

Incidentally, the card detecting mechanisms 15 & 16 may be optical sensors of a reflective type. In this case, at a time when a light receiving part does not receive light from a light emitting part in the card detecting mechanisms 15 & 16, the card detecting mechanisms 15 & 16 are in an OFF situation. In the meantime, if the light receiving part receives the light, which is launched from the light emitting part in the card detecting mechanisms 15 & 16 and reflected by the card 2, the card insertion detecting mechanism 14 gets into the ON situation.

The card transfer mechanism 8 is provided with a transfer roller 26 that contacts the card 2 to transfer the card 2 through the card transfer path 7, a motor 28 (refer to FIG. 4) for driving the transfer roller 26, and a power transmission mechanism (not illustrated in the drawings) for transmitting a power of the motor 28 to the transfer roller 26. The transfer roller 26 is placed inside the main body 6. Namely, the transfer roller 26 is placed at a deeper side position than the card insertion detecting mechanism 14 is. Moreover, the transfer roller 26 is placed at a nearer side position than the card detecting mechanisms 15 & 16 are.

As shown in FIG. 3, a pad roller 29 is placed so as to face the transfer roller 26. In the meantime, the transfer roller 26 and the pad roller 29 face each other in a vertical direction. Moreover, the pad roller 29 is biased toward the transfer roller 26, and then the card 2 is transferred while being sandwiched between the transfer roller 26 and the pad roller 29. Incidentally, the card transfer mechanism 8 is provided with some other transfer roller and pad roller (not illustrated in the drawings) that are placed at deeper side positions than the transfer roller 26 is, in addition to the transfer roller 26 and the pad roller 29.

The motor 28 is provided with an encoder 30 for detecting a turn of the motor 28. In the present embodiment, even in a situation where the motor 28 is in a stop state, the transfer roller 26 can be turned. If the transfer roller 26 turns in a situation where the motor 28 is in a stop state, a turn of the motor 28 is detected by the encoder 30. In other words, if the transfer roller 26 turns in a situation where the motor 28 is in a stop state, a turn of transfer roller 26 is detected by the encoder 30. The motor 28 and the encoder 30 are electrically connected to the control unit 17. The encoder 30 according to the present embodiment is a turn detecting mechanism for detecting a turn of the transfer roller 26.

(Control Method of the Card Reader)

Figure 5A:
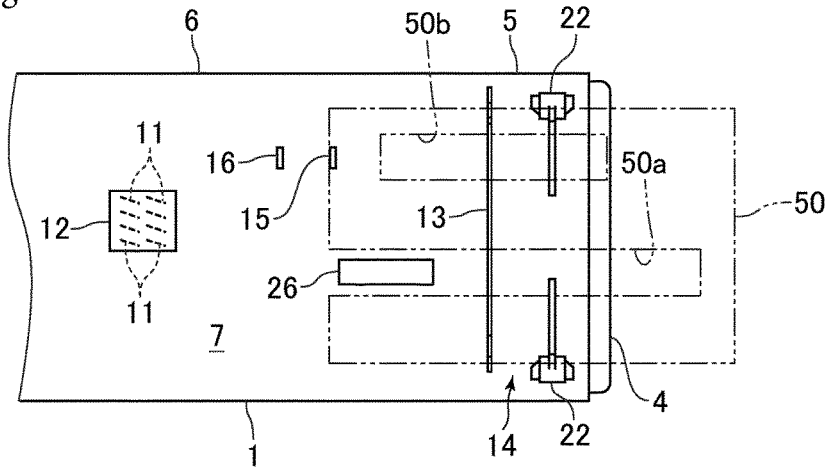
FIGS. 5(A), 5(B), and 5(C) include plan view drawings for explaining a relationship in a layout of each configuration of a skimming device presumed to be attached inside the card reader shown in FIGS. 1A, 1B, and 1C, and the card reader.
Figure 5B:
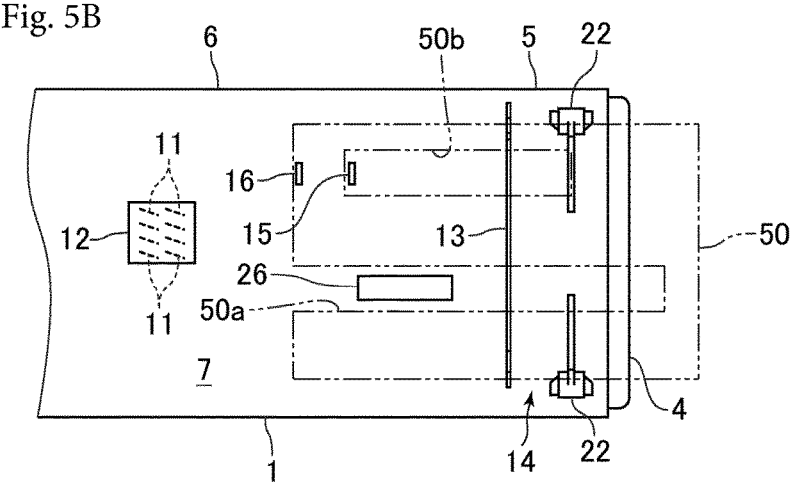
Figure 5C:
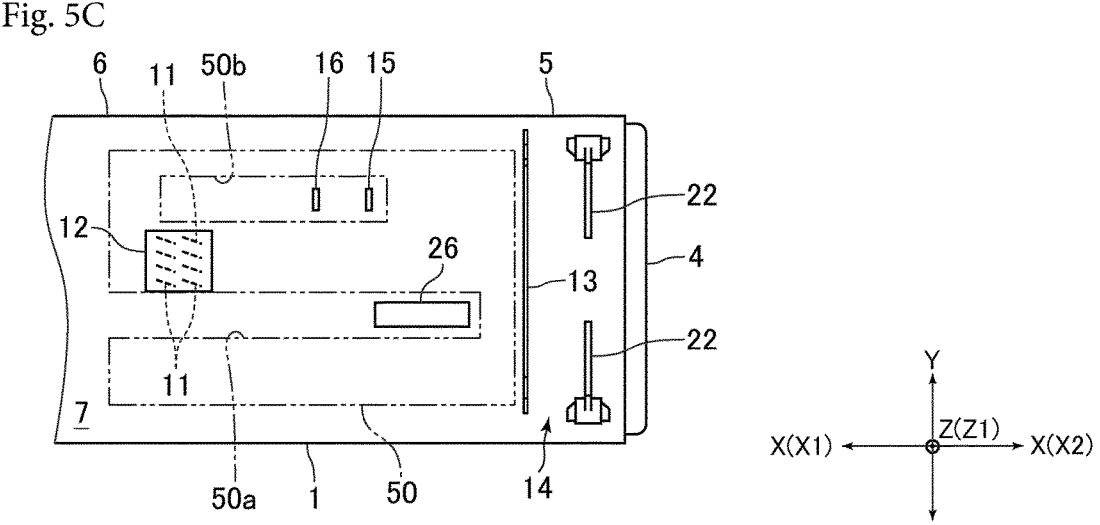
Figure 6:
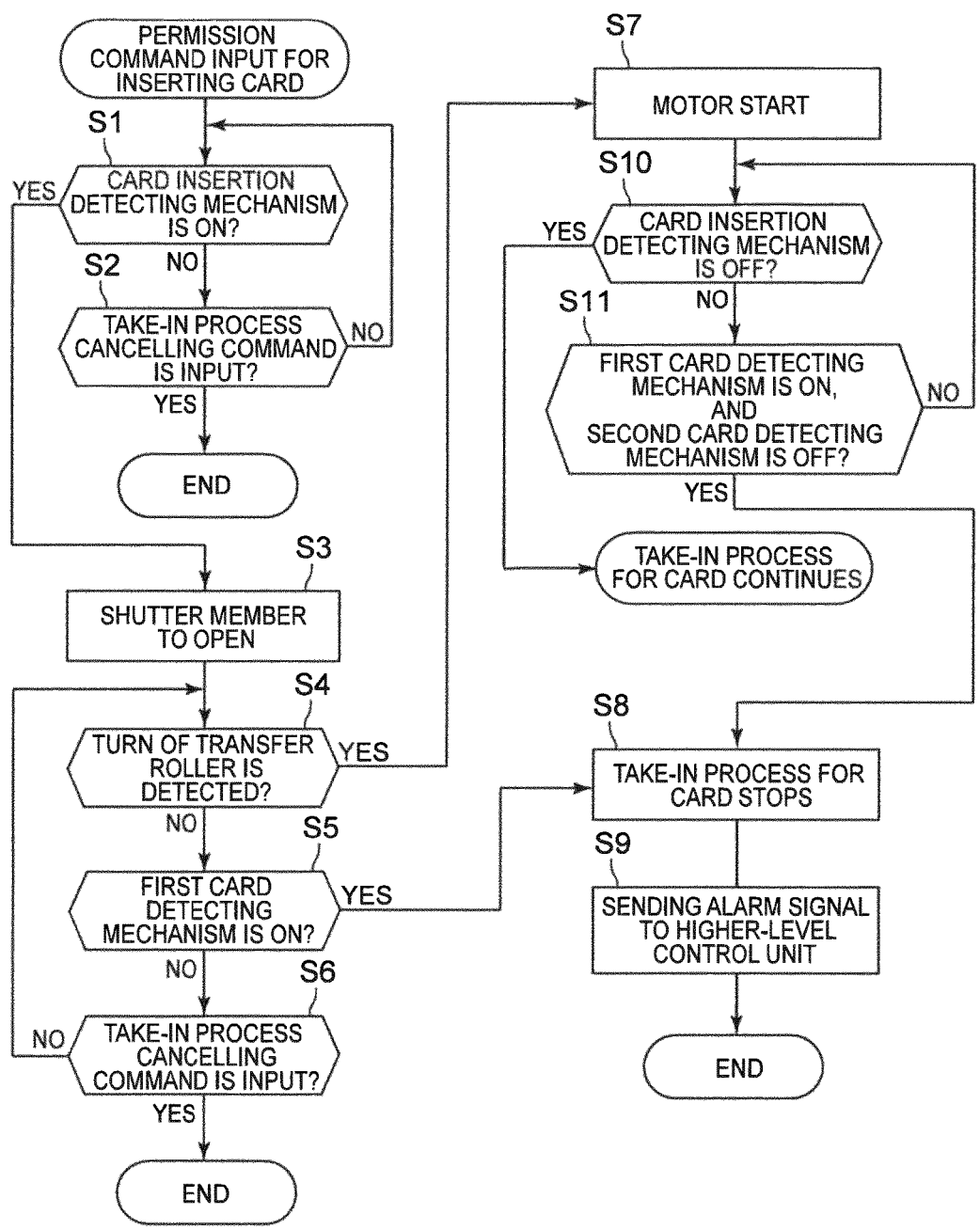
FIG. 6 is a flowchart for explaining an example of a control method at a time of taking in a card by the card reader shown in FIGS. 1A, 1B, and 1C
Figure 7:
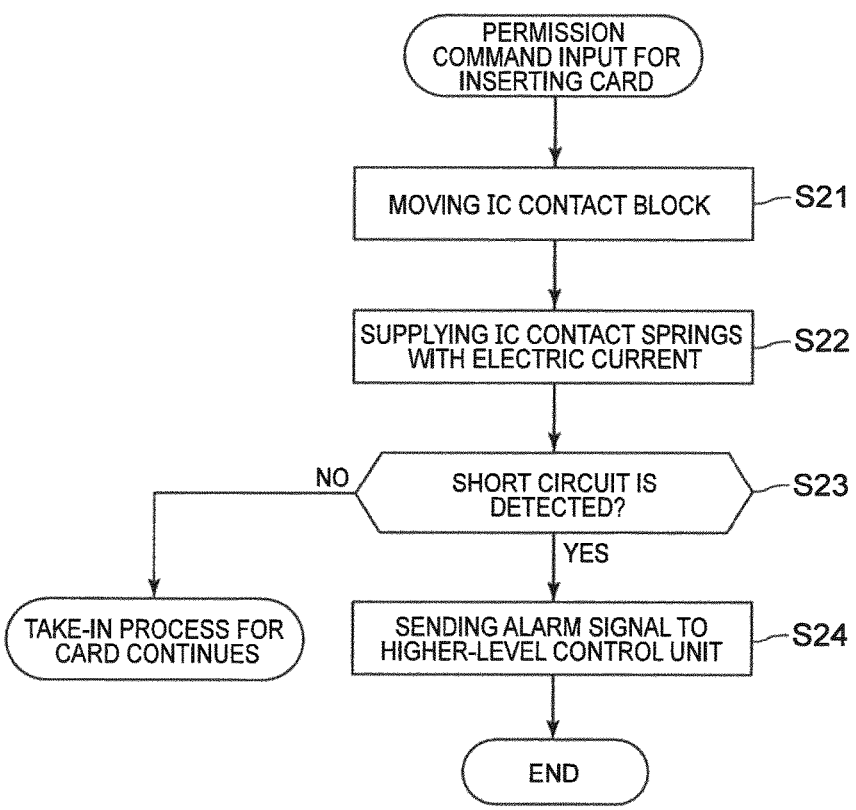
FIG. 7 is a flowchart for explaining an example of a control method prior to taking-in operation of a card by the card reader shown in FIGS. 1A, 1B, and 1C.

FIGS. 5A, 5B, and 5C include plan view drawings for explaining a relationship in a layout of each configuration of a skimming device 50 presumed to be attached inside the card reader 1 shown in FIGS. 1A, 1B, and 1C, and the card reader 1. FIG. 6 is a flowchart for explaining an example of a control method at a time of taking in the card 2 by the card reader 1 shown in FIGS. 1A, 1B, and 1C. FIG. 7 is a flowchart for explaining an example of a control method prior to taking in the card 2 by the card reader 1 shown in FIGS. 1A, 1B, and 1C.

It is presumed that, for example, the skimming device 50 shown in FIGS. 5A, 5B, and 5C is attached inside the card reader 1 according to the present embodiment. The skimming device 50 is configured so as to be rectangular plate-like. Moreover, the skimming device 50 is configured with an electrically-conductive material having electrical conductivity. Concretely to describe, the skimming device 50 is configured with metal. In the skimming device 50, there is shaped a cutout part 50a in order to avoid contacting the transfer roller 26. Moreover, in the skimming device 50, there is shaped a through-hole 50b (refer to FIG. 5C), in order not to block light coming from the light emitting parts 15a & 16a toward the light receiving parts 15b & 16b, at a time when the skimming device 50 is attached inside the card reader 1.

The control unit 17 controls the card reader 1, as described below, at a time of taking in the card 2, in such a way that the skimming device 50 is not attached inside the card reader 1. Namely; if the higher-level device 3 executes a predetermined operation and a permission command for inserting the card 2 into the insertion slot 4 is input from the higher-level control unit 18 to the control unit 17, the control unit 17 judges at first whether or not the card insertion detecting mechanism 14 has switched from an OFF situation to an ON situation (Step S1), as shown in FIG. 6. If the card insertion detecting mechanism 14 is still in the OFF situation at Step S1, the control unit 17 judges whether or not a take-in process cancelling command to cancel a take-in process for the card 2 is input from the higher-level control unit 18 to the control unit 17 (Step S2). In other words, the control unit 17 judges whether or not the higher-level device 3 has executed a predetermined operation for cancelling the take-in process for the card 2.

At Step S2, if the take-in process cancelling command is input from the higher-level control unit 18 to the control unit 17, the take-in process for the card 2 by the card reader 1 finishes. On the other hand, at Step S2, if the take-in process cancelling command is not input from the higher-level control unit 18 to the control unit 17, operation returns to Step S1. In the meantime, if the card insertion detecting mechanism 14 switches from the OFF situation to the ON situation at Step S1, the shutter member 13 moves from the blocking position to the opening position (Step S3). Then, the control unit 17 judges whether or not the encoder 30 has detected a turn of the transfer roller 26 (Step S4).

If no turn of the transfer roller 26 has been detected at Step S4, the control unit 17 judges whether or not the card detecting mechanism 15 has switched from an OFF situation to an ON situation (Step S5). If the card detecting mechanism 15 is still in the OFF situation at Step S5, the control unit 17 judges whether or not a take-in process cancelling command to cancel a take-in process for the card 2 is input from the higher-level control unit 18 to the control unit 17 (Step S6). At Step S6, if the take-in process cancelling command is input from the higher-level control unit 18 to the control unit 17, the take-in process for the card 2 by the card reader 1 finishes. On the other hand, at Step S6, if the take-in process cancelling command is not input from the higher-level control unit 18 to the control unit 17, operation returns to Step S4.

As shown in FIG. 1B and FIG. 3; if a deep side end of the card 2, inserted through the insertion slot 4, contacts the transfer roller 26, and then the card 2 is further inserted, the transfer roller 26 turns because of being pushed by the card 2. Therefore, the encoder 30 detects a turn of the transfer roller 26 at Step S4. As a result, if once the turn of the transfer roller 26 is detected at Step S4, the motor 28 gets activated so as to start a transfer operation of the card 2 by the card transfer mechanism 8 (Step S7). In other words, at Step S7, a transfer of the card 2 to a deep side of the card reader 1 gets started by the card transfer mechanism 8.

In the meantime, if no turn of the transfer roller 26 is detected at Step S4, and moreover the card detecting mechanism 15 switches from the OFF situation to the ON situation at Step S5 (in other words; even though the encoder 30 detects no turn of the transfer roller 26, the card detecting mechanism 15 switches from the OFF situation to the ON situation), it is presumed that the skimming device 50 is inserted through the insertion slot 4 in such a way that a deep side end of the skimming device 50 reaches the card detecting mechanism 15, as shown in FIG. 5A.

On the other hand; in the case where the card 2 being a normal card is inserted through the insertion slot 4, the deep side end of the card 2 contacts the transfer roller 26, placed at a nearer side position than the card detecting mechanism 15 is, so as to turn the transfer roller 26 in such a way that, the encoder 30 detects a turn of the transfer roller 26, and then subsequently the card detecting mechanism 15 switches from the OFF situation to the ON situation. Namely, in the case where the card 2 being a normal card is inserted through the insertion slot 4, there is no chance that the card detecting mechanism 15 switches from the OFF situation to the ON situation even though the encoder 30 detects no turn of the transfer roller 26.

Therefore, if the card detecting mechanism 15 switches from the OFF situation to the ON situation at Step 5, the control unit 17 stops the take-in process for the card 2 (Step S8), and then sends an alarm signal to the higher-level control unit 18, in order to notify that the skimming device 50 has been inserted through the insertion slot 4 (Step S9). Concretely to describe; at Step S9, the control unit 17 sends the higher-level control unit 18 an alarm signal having a high level of error, in order to notify that the skimming device 50 has been inserted through the insertion slot 4. After sending the alarm signal to the higher-level control unit 18, the take-in process for the card 2 by the card reader 1 finishes. In the meantime; the higher-level control unit 18, to which the alarm signal has been input, executes a predetermined process, such as halting the operation of the higher-level device 3, in order to prevent the skimming device 50 from being attached inside the card reader 1.

Meanwhile, if the motor 28 gets activated at Step S7 and a transfer process of the card 2 by the card transfer mechanism 8 starts, the control unit 17 judges whether or not the card insertion detecting mechanism 14 has switched from an ON situation to an OFF situation (Step S10). If the card insertion detecting mechanism 14 has switched from the ON situation to the OFF situation at Step S10, a subsequent take-in process for the card 2 continues. On the other hand; if the card insertion detecting mechanism 14 is still in the ON situation at Step S10, the control unit 17 judges whether or not the card detecting mechanism 15 is in an OFF situation and furthermore the card detecting mechanism 16 is in an ON situation (Step S11).

In the case where the both of the card detecting mechanisms 15 & 16 are in an ON situation after the transfer process of the card 2 by the card transfer mechanism 8 starts, it is presumed that the deep side end of the card 2 has already reached the card detecting mechanism 16 even though a near side end of the card 2 has not yet passed the card insertion detecting mechanism 14, as shown in FIG. 1C. Meanwhile, in the case where the both of the card detecting mechanisms 15 & 16 are in an OFF situation after the transfer process of the card 2 by the card transfer mechanism 8 starts, it is presumed that the deep side end of the card 2 has not yet reached the card detecting mechanism 15. Then, in the case where the card detecting mechanism 15 is in an ON situation and the card detecting mechanism 16 is in an OFF situation after the transfer process of the card 2 by the card transfer mechanism 8 starts, it is presumed that the deep side end of the card 2 has reached a middle position between the card detecting mechanism 15 and the card detecting mechanism 16. Then, in the case of "No" as a result at Step S11, operation returns to Step S10.

In the meantime, in the case where the card detecting mechanism 15 is in an OFF situation and the card detecting mechanism 16 is in an ON situation at Step S11 (in other words, the card detecting mechanism 16 is in an ON situation even though the card detecting mechanism 15 is in the OFF situation), it is presumed that the skimming device 50 has been inserted through the insertion slot 4, as shown in FIG. 5B, in such a way that the deep side end of the skimming device 50 reaches the card detecting mechanism 16 and furthermore a section, where the through-hole 50b is formed in the skimming device 50, reaches the card detecting mechanism 15. On the other hand, in the case where the card 2 being a normal card is inserted through the insertion slot 4, there is no chance that the card detecting mechanism 16 has the ON situation even though the card detecting mechanism 15 is in the OFF situation, before the card insertion detecting mechanism 14 switches from an ON situation to an OFF situation.

Therefore, in the case of "Yes" as a result at Step S11, operation progresses to Step S8 so that the control unit 17 stops the take-in process for the card 2. Concretely to describe, the control unit 17 stops the motor 28 at Step S8 after Step S11. Then, subsequently operation progresses to Step S9, and the control unit 17 sends the higher-level control unit 18 an alarm signal, in order to notify that the skimming device 50 has been inserted through the insertion slot 4. Incidentally, in the case of "Yes" as a result at Step S11, it is presumed that a turn of the transfer roller 26 has been detected for some reason at Step S4, even though the skimming device 50 has been inserted through the insertion slot 4.

In this way, according to the present embodiment; if the card detecting mechanism 15 switches from the OFF situation to the ON situation after the card insertion detecting mechanism 14 switches from the OFF situation to the ON situation, even though no turn of the transfer roller 26 is detected by the encoder 30, the alarm signal for notifying that the skimming device 50 has been inserted through the insertion slot 4 is sent to the higher-level control unit 18. Moreover, according to the present embodiment; if the card detecting mechanism 16 switches to the ON situation even though the card detecting mechanism 15 is in the OFF situation, after the card insertion detecting mechanism 14 switches from the OFF situation to the ON situation, and before the card insertion detecting mechanism 14 switches from the ON situation to the OFF situation, the alarm signal for notifying that the skimming device 50 has been inserted through the insertion slot 4 is sent to the higher-level control unit 18.

Furthermore, even in the case where the skimming device 50 has been attached inside the card reader 1 by any chance, the control unit 17 controls the card reader 1 as described below, in order to prevent the skimming device 50 from reading magnetic data. Namely; if the higher-level device 3 executes a predetermined operation and a permission command for inserting the card 2 into the insertion slot 4 is input from the higher-level control unit 18 to the control unit 17, the control unit 17 moves the IC contact block 12, located at the evacuating position, to the contact-enabled position, as shown in FIG. 7 (Step S21). Then, the control unit 17 supplies the IC contact springs 11 with an electric current (Step S22), and judges whether or not a short circuit is detected (in other words, whether or not an over-current is detected) among the plurality of IC contact springs 11 (Step S23).

If the IC contact block 12 is moved to the contact-enabled position in a situation where nothing is placed inside the card reader 1, the plurality of IC contact springs 11 contact the lower guide member 20 formed of a resin material having an insulation quality. Therefore, even if the IC contact block 12 is moved to the contact-enabled position in a situation where nothing is placed inside the card reader 1, and the IC contact springs 11 are supplied with an electric current, there is no chance that any short circuit is detected among the plurality of IC contact springs 11.

In the meantime, according to the present embodiment; if the IC contact block 12 is moved to the contact-enabled position in a situation where the skimming device 50 is attached inside the card reader 1, the plurality of IC contact springs 11 contact the skimming device 50 configured with metal (refer to FIG. 5C). As a result; if the IC contact block 12 is moved to the contact-enabled position in a situation where the skimming device 50 is attached inside the card reader 1, and then the IC contact springs 11 are supplied with an electric current, a short circuit is detected among the plurality of IC contact springs 11. In other words, if a short circuit is detected among the plurality of IC contact springs 11 at a time when the IC contact springs 11 are supplied with an electric current in a situation where the IC contact block 12 is moved to the contact-enabled position, it is presumed that the skimming device 50 is attached inside the card reader 1.

Then, if no short circuit is detected among the plurality of IC contact springs 11 at Step S23, a subsequent take-in process for the card 2 continues. Concretely to describe, operation progresses to Step S1 already described. On the other hand, if a short circuit is detected at Step S23 among the plurality of IC contact springs 11, the control unit 17 sends the higher-level control unit 18 an alarm signal, in order to notify that the skimming device 50 is attached inside the card reader 1 (Step S24). Concretely to describe; at Step S24, the control unit 17 sends the higher-level control unit 18 the alarm signal having a high level of error, in order to notify that the skimming device 50 is attached inside the card reader 1. After sending the alarm signal to the higher-level control unit 18, the take-in process for the card 2 by the card reader 1 finishes. In the meantime; the higher-level control unit 18, to which the alarm signal has been input, executes a predetermined process, such as halting the operation of the higher-level device 3, in order to prevent the skimming device 50 from reading magnetic data.

In this way, according to the present embodiment; at a time when the permission command for inserting the card 2 into the insertion slot 4 is input from the higher-level control unit 18, the IC contact block 12, located at the evacuating position, is moved to the contact-enabled position, and the IC contact springs 11 are supplied with an electric current. Then, if a short circuit among the plurality of IC contact springs 11 is detected, the alarm signal for notifying that the skimming device 50 is attached inside the card reader 1 is sent to the higher-level control unit 18.

Primary Advantageous Effect of the Present Embodiment

As explained above, in the present embodiment; if the card detecting mechanism 15 switches from the OFF situation to the ON situation after the card insertion detecting mechanism 14 switches from the OFF situation to the ON situation, even though no turn of the transfer roller 26 is detected by the encoder 30, the control unit 17 sends the higher-level control unit 18 the alarm signal for notifying that the skimming device 50 has been inserted through the insertion slot 4. Moreover, according to the present embodiment; if the card detecting mechanism 16 switches to the ON situation even though the card detecting mechanism 15 is in the OFF situation, after the card insertion detecting mechanism 14 switches from the OFF situation to the ON situation, and before the card insertion detecting mechanism 14 switches from the ON situation to the OFF situation, the control unit 17 sends the higher-level control unit 18 the alarm signal for notifying that the skimming device 50 has been inserted through the insertion slot 4.

In other words, according to the present embodiment; if it is presumed that the skimming device 50 has been inserted through the insertion slot 4, the control unit 17 sends the higher-level control unit 18 the alarm signal for notifying that the skimming device 50 has been inserted through the insertion slot 4, as described above. Furthermore, according to the present embodiment; if once this alarm signal is sent to the higher-level control unit 18, the take-in process for the card 2 by the card reader 1 finishes, and meanwhile, the higher-level control unit 18, to which the alarm signal has been input, executes a predetermined process, such as halting the operation of the higher-level device 3, in order to prevent the skimming device 50 from being attached inside the card reader 1. Therefore, according to the present embodiment, it becomes possible to prevent the skimming device 50, having a certain shape as shown in FIGS. 5A, 5B, and 5C, from being attached inside the card reader 1.

In the present embodiment, at a time when a permission command for inserting the card 2 into the insertion slot 4 is input from the higher-level control unit 18, the IC contact block 12, located at the evacuating position, is moved to the contact-enabled position, and the IC contact springs 11 are supplied with an electric current. Then, if a short circuit is detected among the plurality of IC contact springs 11, the control unit 17 sends the higher-level control unit 18 the alarm signal for notifying that the skimming device 50 is attached inside the card reader 1. Namely, in the present embodiment as described above; in the case where it is presumed that the skimming device 50 is attached inside the card reader 1, the control unit 17 sends the higher-level control unit 18 the alarm signal for notifying that the skimming device 50 is attached inside the card reader 1.

Moreover, according to the present embodiment; if once the alarm signal is sent to the higher-level control unit 18, the take-in process for the card 2 by the card reader 1 finishes, and then the higher-level control unit 18, to which the alarm signal has been input, executes a predetermined process, such as halting the operation of the higher-level device 3, in order to prevent the skimming device 50 from reading magnetic data. Therefore, according to the present embodiment; it becomes possible to prevent the skimming device 50, configured with an electrically-conductive material and having a certain shape, from reading magnetic data even if the skimming device 50 is attached inside the card reader 1 by any chance.

Incidentally, according to the present embodiment; by way of modification of software of the card reader 1 having an existing hardware configuration, it becomes possible to prevent the skimming device 50 from being attached inside the card reader 1; and then even if the skimming device 50 is attached inside the card reader 1 by any chance, it becomes possible to prevent the skimming device 50 from reading magnetic data. In other words, according to the present embodiment, it becomes possible to take countermeasures against skimming, without modification of the hardware configuration of the card reader 1. As a result of that, it becomes possible in the card reader 1 to take countermeasures against skimming, in a comparatively easy manner.

(Modification 1 of Card Reader and Control Method of the Card Reader)

Figure 8A:
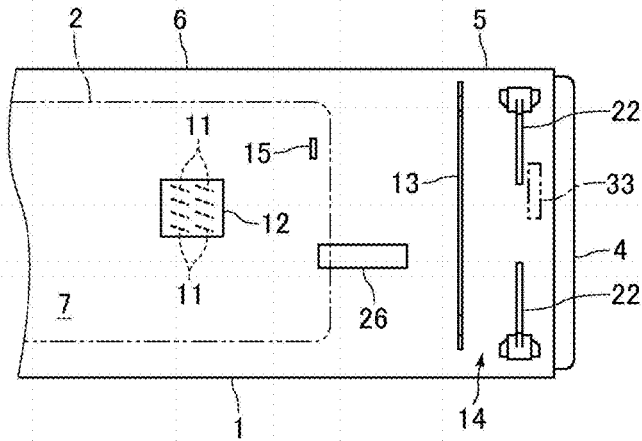
FIGS. 8(A), 8(B), and 8(C) include three diagrams; where
Figure 8B:
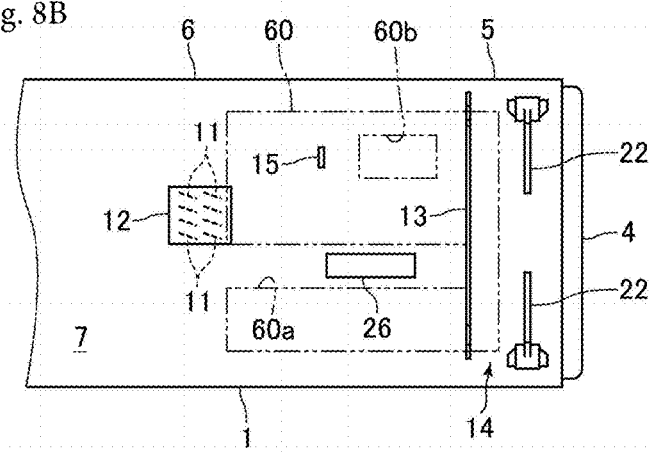
Figure 8C:
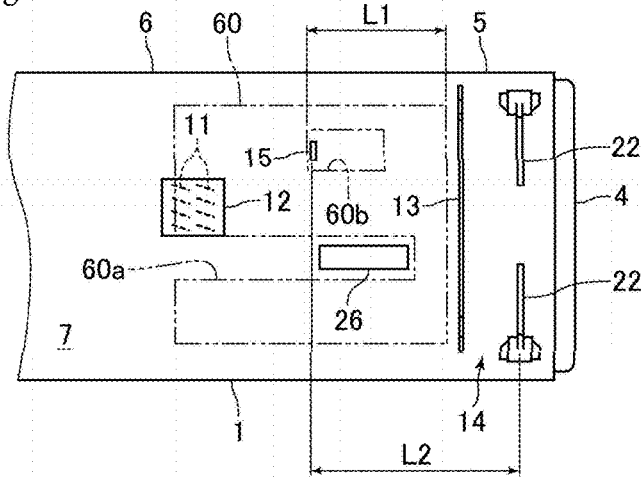
Figure 9:
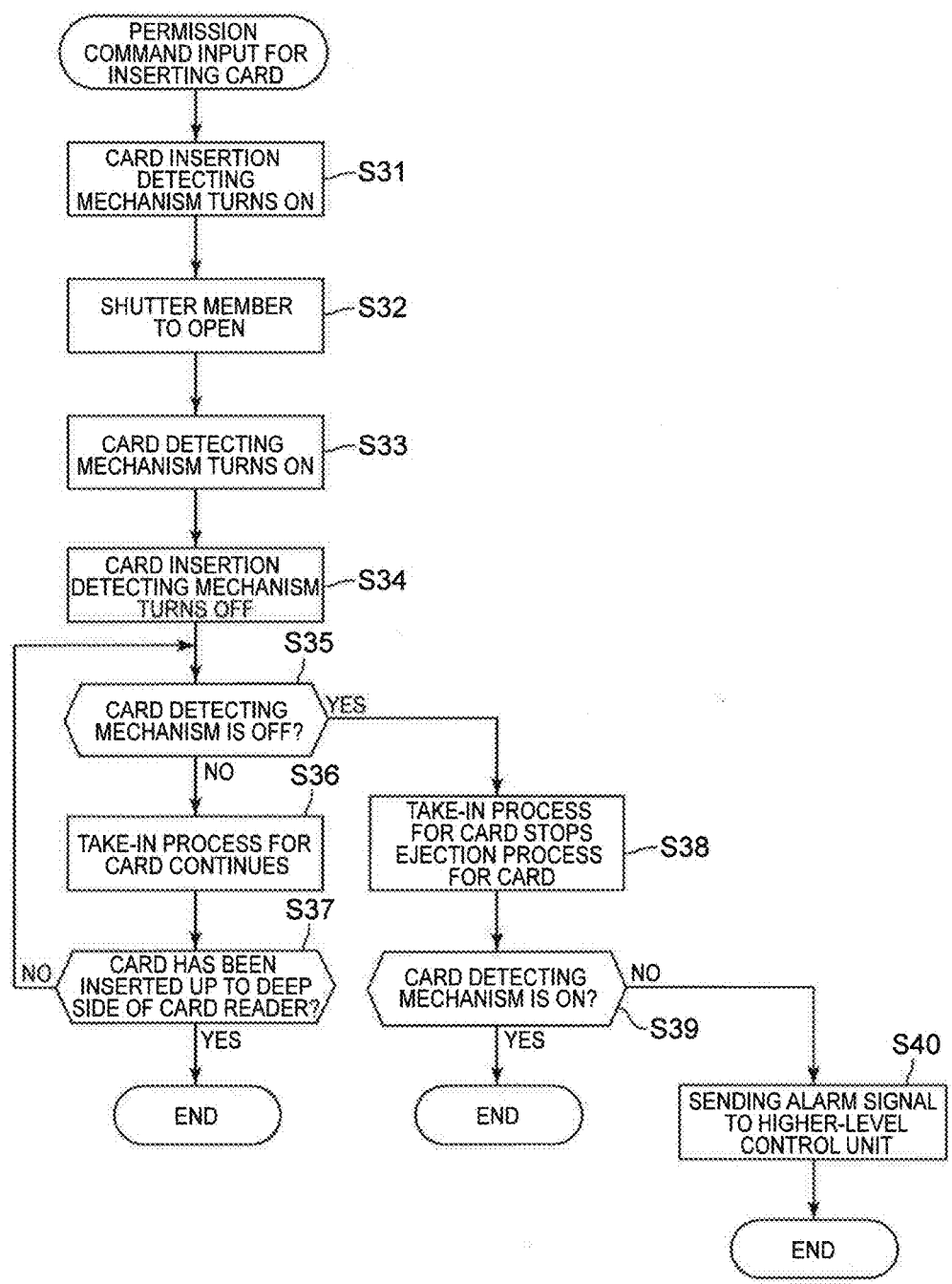
FIG. 9 is a flowchart for explaining an example of a control method at a time of taking in a card by the card reader shown in FIG. 8A.

FIG. 8A is a plan view diagram for explaining a configuration of a card reader 1 according to another embodiment of the present invention; and FIG. 8B and FIG. 8C are plan view drawings for explaining a relationship in a layout of each configuration of a skimming device 60 presumed to be attached inside the card reader 1 shown in FIG. 8A, and the card reader 1. FIG. 9 is a flowchart for explaining an example of a control method at a time of taking in a card 2 by the card reader 1 shown in FIG. 8A.

In the case where a near side end of the card 2, transferred to a deep side position by the card transfer mechanism 8, is placed at a nearer side position than the card detecting mechanism 15 is, at a time of handling the card 2 by the card reader 1, as shown in FIG. 8A (More specifically to describe, a near side end of the card 2, transferred up to a deepest side position, is placed at a nearer side position than the card detecting mechanism 15 is, at a time of handling the card 2 by the card reader 1), the control unit 17 may control the card reader 1 as described below, at a time of taking in the card 2, in order to prevent the skimming device 60 from being attached inside the card reader 1.

Incidentally, the card reader 1 of this modification is not provided with the card detecting mechanism 16. Furthermore, in the skimming device 60 presumed to be attached inside the card reader 1, there is shaped a cutout part 60a in order to avoid contacting the transfer roller 26, and moreover there is shaped a through-hole 60b (refer to FIG. 8C), in order not to block light coming from the light emitting part 15a toward the light receiving part 15b, at a time when the skimming device 60 is attached inside the card reader 1; in the same way as these shaped parts are in the skimming device 50. Meanwhile, in the skimming device 60, a distance L1 between a deep side end of the through-hole 60b and a near side end of the skimming device 60 is shorter than a distance L2 between the card insertion detecting mechanism 14 and the card detecting mechanism 15 in a front-back direction.

If the higher-level device 3 executes a predetermined operation and a permission command for inserting the card 2 into the insertion slot 4 is input from the higher-level control unit 18 to the control unit 17, and the card insertion detecting mechanism 14 has switched from an OFF situation to an ON situation (Step S31), as shown in FIG. 9, the shutter member 13 moves from the blocking position to the opening position (Step S32). Then, the card detecting mechanism 15 switches from the OFF situation to the ON situation (Step S33) and the card insertion detecting mechanism 14 switches from the ON situation to the OFF situation (Step S34). Subsequently, the control unit 17 judges whether or not the card detecting mechanism 15 has switched from the ON situation to the OFF situation (Step S35).

In this modification, the near side end of the card 2, transferred up to the deepest side position, is placed at a nearer side position than the card detecting mechanism 15 is, at the time of handling the card 2 by the card reader 1. Therefore, in the case where the card 2 being a normal card is inserted through the insertion slot 4; there is no chance that the card detecting mechanism 15, which has switched from the OFF situation to the ON situation at the time of taking the card 2 into the card reader 1, switches again to the OFF situation. On the other hand, if the skimming device 60 is inserted through the insertion slot 4; the card detecting mechanism 15, which has switched from the OFF situation to the ON situation, switches again to the OFF situation, at a time of take-in to the card reader 1, as shown in FIG. 8B and FIG. 8C. In the meantime, for example, if there partially exists a transparent portion in the card 2 inserted through the insertion slot 4, there is a chance that that the card detecting mechanism 15, which has switched from the OFF situation to the ON situation at the time of take-in to the card reader 1, switches again to the OFF situation.

Therefore, in the case where the card detecting mechanism 15 keeps on having the ON situation at Step S35, the take-in process for the card 2 continues (Step S36), and the control unit 17 judges whether or not the card 2 has been inserted up to a deep side of the card reader 1 (Step S37). If the card 2 has been inserted up to the deep side of the card reader 1 at Step S37, the take-in process for the card 2 comes to an end as it is; and on the other hand, if the card 2 has not been inserted up to the deep side of the card reader 1 at Step S37, operation return to Step S35.

Meanwhile, if the card detecting mechanism 15 switches from the ON situation to the OFF situation at Step S35, the control unit 17 stops the take-in process for the card 2, and carries out an ejection process for the card 2 (Step S38). In other words, the control unit 17 stops the take-in process for the card 2, and makes the card transfer mechanism 8 carry out a transfer operation toward a near side, at Step S38. Then, the control unit 17 judges whether or not the card insertion detecting mechanism 14 has switched from an OFF situation to an ON situation (Step S39).

As described above, in the case where the card detecting mechanism 15 switches to the OFF situation at Step S35 because, for example, there partially exists a transparent portion in the card 2; the card transfer mechanism 8 transfers the card 2 toward a near side, by way of the ejection process for the card 2 at Step S38, and then the card insertion detecting mechanism 14 switches from the OFF situation to the ON situation. Meanwhile, in a situation where the card insertion detecting mechanism 14 has switched from the OFF situation to the ON situation, it becomes possible to pull the card 2 out of the insertion slot 4. Accordingly, if the card insertion detecting mechanism 14 switches from the OFF situation to the ON situation at Step S39, the take-in process for the card 2 finishes. Then, if once the card 2 is pulled out of the insertion slot 4, it becomes possible, for example, to continuously use the higher-level device 3.

On the other hand, in the case where the card insertion detecting mechanism 14 keeps on having the OFF situation at Step S39; it is presumed that the skimming device 60 is inserted up to an internal part of the card reader 1, as shown in FIG. 8C, so that the card transfer mechanism 8 cannot transfer the skimming device 60 to a near side, even with the ejection process for the card 2 at Step S38, and therefore the card insertion detecting mechanism 14 does not switch from the OFF situation to the ON situation.

Therefore, in the case where the card insertion detecting mechanism 14 keeps on having the OFF situation at Step S39, the control unit 17 sends the higher-level control unit 18 the alarm signal for notifying that the skimming device 60 has been inserted through insertion slot 4 (Step S40). After sending the alarm signal to the higher-level control unit 18, the take-in process for the card 2 by the card reader 1 finishes. In the meantime; the higher-level control unit 18, to which the alarm signal has been input, executes a predetermined process, such as halting the operation of the higher-level device 3, in order to prevent the skimming device 60 from being attached inside the card reader 1.

Thus, according to this modification; if the card detecting mechanism 15 switches from the OFF situation to the ON situation, after the card insertion detecting mechanism 14 switches from an OFF situation to an ON situation, at the time of taking the card 2 into the card reader 1, and then the card detecting mechanism 15 switches to the OFF situation, after the card insertion detecting mechanism 14 switches from the ON situation to the OFF situation; the card transfer mechanism 8 carries out a transfer operation toward a near side, and subsequently the alarm signal for notifying that the skimming device 60 has been inserted through insertion slot 4 is sent to the higher-level control unit 18 if the card insertion detecting mechanism 14 keeps on having the OFF situation. In the meantime; the higher-level control unit 18, to which the alarm signal has been input, executes a predetermined process, such as halting the operation of the higher-level device 3, in order to prevent the skimming device 60 from being attached inside the card reader 1. Therefore, according to this modification, it becomes possible to prevent the skimming device 60, having a certain shape, from being attached inside the card reader 1.

(Modification 2 of Card Reader and Control Method of the Card Reader)

In the case where a near side end of the card 2, transferred to a deep side position by the card transfer mechanism 8, is placed at a nearer side position than the card detecting mechanism 15 is, at a time of handling the card 2 by the card reader 1, as shown in FIG. 8A, and a metal detecting mechanism 33 is provided to the card reader 1, for detecting the external connection terminal 2b of the card 2 by way of switching from an OFF situation to an ON situation; the control unit 17 may control the card reader 1 as described below, at a time of taking in the card 2, in order to prevent the skimming device 60 from being attached inside the card reader 1.

Incidentally, the metal detecting mechanism 33 is placed, as shown with a chain double-dashed line in FIG. 8A, at an internal section of the card insertion part 5, being placed at a deep side position of the insertion slot 4. In other words, the card detecting mechanism 15 is located at a deeper side position than the metal detecting mechanism 33 is. Meanwhile, the metal detecting mechanism 33 is configured with an exciting coil, a detecting coil, and a magnetic material; and the metal detecting mechanism 33 is provided with a core, around which the exciting coil and the detecting coil are wound.

According to this modification; if the metal detecting mechanism 33 turns ON and OFF in a mode, which is different from a mode in the case where the card 2 being a normal card, with the external connection terminal 2b formed, is inserted through the insertion slot 4, and the card detecting mechanism 15 switches to the OFF situation, after the card detecting mechanism 15 switches from the OFF situation to the ON situation; the control unit 17 sends the higher-level control unit 18 the alarm signal for notifying that the skimming device 60 has been inserted through insertion slot 4. Namely, in the case where a detection result is obtained with the metal detecting mechanism 33 and card detecting mechanism 15, the detection result being not expected at a time when the card 2 being a normal card, with the external connection terminal 2b configured, is inserted through the insertion slot 4; it is presumed that the skimming device 60 has been inserted through insertion slot 4. Then, the control unit 17 sends the higher-level control unit 18 the alarm signal for notifying that the skimming device 60 has been inserted through insertion slot 4.

In the meantime; the higher-level control unit 18, to which the alarm signal has been input, executes a predetermined process, such as halting the operation of the higher-level device 3, in order to prevent the skimming device 60 from being attached inside the card reader 1. Therefore, according to this modification, it becomes possible to prevent the skimming device 60, configured with a metal and having a certain shape, from being attached inside the card reader 1.

Incidentally, according to this modification; for example, if the card 2 partially including a transparent portion is inserted through insertion slot 4; after the card detecting mechanism 15 switches from an OFF situation to an ON situation, it may potentially happen that the card detecting mechanism 15 switches to the OFF. Fortunately, in this case, if the card 2 is a card with a special design in which the external connection terminal 2b is formed at the same position as it is in the card 2 being a normal card, the metal detecting mechanism 33 turns ON and OFF in the same mode as in the case where the card 2 being a normal card is inserted through insertion slot 4. Therefore, it becomes possible to determine whether the card 2 with a special design, in which the external connection terminal 2b is formed at the same position as it is in the card 2 being a normal card, has been inserted through insertion slot 4, or the skimming device 60, configured with a metal and having a certain shape, has been inserted through insertion slot 4.

Other Embodiments

Described above is an example of at least an embodiment according to the present invention. However, the present invention is not limited to the above embodiment and various variations and modifications may be made without changing the concept of the present invention.

In the embodiment described above, operation may progress to Step S7, immediately after Step S3. Moreover, in the embodiment described above, a take-in process for the card 2 being a next card may continue, immediately after Step S7. Even in these cases, it becomes possible to prevent the skimming device 50, having a certain shape as shown in FIGS. 5A, 5B, and 5C, from being attached inside the card reader 1.

Although in the embodiments described above, the card insertion detecting mechanism 14 is a width detecting mechanism that detects the card 2 having been inserted into the insertion slot 4, by way of detecting a width of the card 2 inserted into the insertion slot 4, the card insertion detecting mechanism 14 may be a detecting mechanism that detects the card 2 having been inserted into the insertion slot 4, by way of detecting a deep side end surface of the card 2 inserted through insertion slot 4, and may be a detecting mechanism that detects the card 2 having been inserted into the insertion slot 4, by way of detecting the magnetic stripe 2a of the card 2 inserted through the insertion slot 4. Moreover, although in the embodiments described above, the card detecting mechanisms 15 & 16 are optical sensors, the card detecting mechanisms 15 & 16 may individually be any detecting mechanism other than such an optical sensor.

Although in the embodiments described above, a turn of the transfer roller 26 is detected by the encoder 30 for detecting a turn of the motor 28, there may separately be provided a turn detecting mechanism for detecting the turn of the transfer roller 26. Moreover, although in the embodiments described above, the card 2 is a card made of polyvinyl chloride, having a thickness of about 0.7 to 0.8 mm, the card 2 may be a polyethylene terephthalate (PET) card having a thickness of about 0.18 to 0.36 mm, or a paper card having a predetermined thickness, and the like. Furthermore, although in the embodiments described above, the card reader 1 is a card reader of a card-transfer type, provided with the card transfer mechanism 8, the card reader 1 may be a manual card reader with which a user carries out reading and recording magnetic data while manually moving the card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader to be installed for use in a higher-level device, where a side with an insertion slot configured for a card is represented as a near side, and an opposite side to the near side is represented as a deep side, the card reader comprising:
   a card transfer path where the card inserted through the insertion slot is transferred;
   a card insertion detecting mechanism, placed at a deep side of the insertion slot, structured to detect the card by way of switching from an OFF situation to an ON situation;
   a transfer roller, placed at a deeper side position than the card insertion detecting mechanism is, structured to transfer the card through the card transfer path;
   a turn detecting mechanism structured to detect a turn of the transfer roller; and
   a card detecting mechanism, placed at a deeper side position than the transfer roller is, structured to detect the card by way of switching from an OFF situation to an ON situation; and a control unit;
   wherein, the control unit structured such that, if the card detecting mechanism switches from the OFF situation to the ON situation after the card insertion detecting mechanism switches from the OFF situation to the ON situation, even though no turn of the transfer roller is detected by the turn detecting mechanism, the control unit of the card reader sends a control unit of the higher-level device an alarm signal for notifying that a skimming device has been inserted through the insertion slot.

2. A control method for a card reader to be installed for use in a higher-level device, where a side with an insertion slot configured for a card is represented as a near side, and an opposite side to the near side is represented as a deep side, the card reader comprising:
   a card transfer path where the card inserted through the insertion slot is transferred;
   a card insertion detecting mechanism, placed at a deep side of the insertion slot, structured to detect the card by way of switching from an OFF situation to an ON situation;
   a transfer roller, placed at a deeper side position than the card insertion detecting mechanism is, structured to transfer the card through the card transfer path;
   a turn detecting mechanism structured to detect a turn of the transfer roller; and
   a card detecting mechanism, placed at a deeper side position than the transfer roller is, structured to detect the card by way of switching from an OFF situation to an ON situation;
   wherein, if the card detecting mechanism switches from the OFF situation to the ON situation after the card insertion detecting mechanism switches from the OFF situation to the ON situation, even though no turn of the transfer roller is detected by the turn detecting mechanism, an alarm signal for notifying that a skimming device has been inserted through the insertion slot is sent to a control unit of the higher-level device.

* * * * *